US012752835B2

(12) United States Patent
Slave

(10) Patent No.: US 12,752,835 B2
(45) Date of Patent: Oct. 6, 2026

(54) STEERING GEARS WITH ELECTRIC STEERING ASSIST SYSTEMS AND RELATED METHODS

(71) Applicant: Ford Global Technologies, LLC, Dearborn, MI (US)

(72) Inventor: Renato Bernardinetti Slave, São Caetano do Sul (BR)

(73) Assignee: Ford Global Technologies, LLC, Dearborn, MI (US)

( * ) Notice: Subject to any disclaimer, the term of this patent is extended or adjusted under 35 U.S.C. 154(b) by 571 days.

(21) Appl. No.: 18/322,150

(22) Filed: May 23, 2023

(65) Prior Publication Data

US 2024/0391518 A1 Nov. 28, 2024

(51) Int. Cl.

| | |
|---|---|
| ***B62D 5/04*** | (2006.01) |
| ***B62D 3/02*** | (2006.01) |
| ***B62D 15/02*** | (2006.01) |
| ***F16H 25/22*** | (2006.01) |
| ***H02K 7/06*** | (2006.01) |
| ***H02K 7/116*** | (2006.01) |

(Continued)

(52) U.S. Cl.

CPC ............. *B62D 5/0448* (2013.01); *B62D 3/02* (2013.01); *B62D 5/0403* (2013.01); *B62D 5/0421* (2013.01); *B62D 5/0463* (2013.01); *B62D 15/0225* (2013.01); *F16H 25/2204* (2013.01); *H02K 7/06* (2013.01); *H02K 7/116* (2013.01); *H02K 9/19* (2013.01); *H02K 41/031* (2013.01); *F16H 2025/2031* (2013.01); *F16H 2025/2075* (2013.01); *F16H 2025/2087* (2013.01)

(58) Field of Classification Search

CPC ...... B62D 5/0448; B62D 3/02; B62D 5/0403; B62D 5/0421; B62D 5/0463; B62D 15/0225; F16H 25/2204

See application file for complete search history.

(56) References Cited

U.S. PATENT DOCUMENTS

| | | |
|---|---|---|
| 3,868,888 A | 3/1975 | Rehfeld |
| 3,893,528 A | 7/1975 | Rehfeld |

(Continued)

FOREIGN PATENT DOCUMENTS

| | | |
|---|---|---|
| AU | 2010295220 B2 | 12/2011 |
| CN | 203946160 U | 11/2014 |

(Continued)

OTHER PUBLICATIONS

United States Patent and Trademark Office, "Non-Final Office Action" issued in connection with U.S. Appl. No. 17/087,557, dated Dec. 7, 2022, 10 pages.

(Continued)

*Primary Examiner* — Valentin Neacsu
*Assistant Examiner* — Michael R Stabley
(74) *Attorney, Agent, or Firm* — Lorne Forsythe; Hanley, Flight & Zimmerman, LLC

(57) ABSTRACT

Electric steering gears and related methods are disclosed herein. An example apparatus disclosed herein includes a shaft, a helical groove disposed on the shaft, a ball nut rack engaged with the helical groove, the ball nut rack including a plurality of bearings, a motor configured to apply force to the ball nut rack, and a gear housing, the ball nut rack, the helical groove, and the motor disposed within the gear housing.

15 Claims, 12 Drawing Sheets

(51) Int. Cl.
*H02K 9/19* (2006.01)
*H02K 41/03* (2006.01)
*F16H 25/20* (2006.01)

(56) References Cited

U.S. PATENT DOCUMENTS

| | | | | | |
|---|---|---|---|---|---|
| 4,415,054 | A * | 11/1983 | Drutchas | B62D 5/0448 74/89.41 |
| 5,267,625 | A | 12/1993 | Shimizu | |
| 5,341,701 | A | 8/1994 | Krom et al. | |
| 5,437,349 | A * | 8/1995 | Kurahashi | B62D 5/04 180/446 |
| 5,482,131 | A | 1/1996 | Cortes Guasch et al. | |
| 6,026,924 | A * | 2/2000 | Godek | B62D 5/0427 280/90 |
| 6,227,064 | B1 * | 5/2001 | Nakamura | F16H 25/2295 180/443 |
| 6,237,713 | B1 * | 5/2001 | Onodera | B62D 5/0403 180/443 |
| 6,516,680 | B1 * | 2/2003 | Nakamura | B62D 5/0445 74/424.81 |
| 6,776,254 | B1 * | 8/2004 | Brunnschweiler | B62D 5/0427 180/444 |
| 6,810,985 | B1 | 11/2004 | Budaker et al. | |
| 6,848,536 | B2 * | 2/2005 | Namgung | B62D 5/0448 180/444 |
| 7,337,689 | B2 * | 3/2008 | Yamamoto | F16H 25/2223 74/424.75 |
| 8,360,197 | B2 | 1/2013 | Escobedo et al. | |
| 8,567,554 | B2 | 10/2013 | Zaloga et al. | |
| 8,931,362 | B2 | 1/2015 | Speidel | |
| 9,346,490 | B2 | 5/2016 | Washnock et al. | |
| 9,975,573 | B2 | 5/2018 | She et al. | |
| 10,141,822 | B2 | 11/2018 | Ricci et al. | |
| 10,421,481 | B2 | 9/2019 | Wilske et al. | |
| 10,461,606 | B2 * | 10/2019 | Ognibene | B62D 5/0403 |
| 11,345,396 | B2 | 5/2022 | Cartwright et al. | |
| 11,685,427 | B2 * | 6/2023 | Major | F16H 25/2228 74/424.82 |
| 11,827,290 | B2 | 11/2023 | Kadam et al. | |
| 11,873,037 | B2 | 1/2024 | Washnock | |
| 12,344,340 | B2 | 7/2025 | Hultén et al. | |
| 2003/0178244 | A1 * | 9/2003 | Namgung | B62D 5/0403 180/443 |
| 2005/0076733 | A1 * | 4/2005 | Yamamoto | B62D 5/0448 74/424.87 |
| 2007/0083326 | A1 | 4/2007 | Johnson et al. | |
| 2007/0089926 | A1 | 4/2007 | Jo et al. | |
| 2013/0032430 | A1 | 2/2013 | Zaloga et al. | |
| 2014/0157922 | A1 | 6/2014 | Schneider | |
| 2014/0311263 | A1 | 10/2014 | Washnock et al. | |
| 2018/0022381 | A1 | 1/2018 | Matsumura et al. | |
| 2018/0111643 | A1 | 4/2018 | Kim et al. | |
| 2018/0244305 | A1 | 8/2018 | Cai et al. | |
| 2019/0065173 | A1 | 2/2019 | Xi et al. | |
| 2019/0351932 | A1 | 11/2019 | Washnock et al. | |
| 2020/0017138 | A1 | 1/2020 | Kirchweger | |
| 2020/0339183 | A1 | 10/2020 | DeHoff et al. | |
| 2021/0038766 | A1 | 2/2021 | Chen et al. | |
| 2021/0155286 | A1 | 5/2021 | Yang et al. | |
| 2021/0261186 | A1 | 8/2021 | Hikida et al. | |
| 2021/0261188 | A1 | 8/2021 | Ko et al. | |
| 2021/0387666 | A1 | 12/2021 | Hultén et al. | |
| 2021/0387667 | A1 | 12/2021 | Ishihara et al. | |
| 2021/0403077 | A1 | 12/2021 | Kogan et al. | |
| 2022/0032991 | A1 | 2/2022 | Pattok et al. | |
| 2022/0169305 | A1 | 6/2022 | Cartwright et al. | |
| 2022/0204072 | A1 | 6/2022 | Boyle | |
| 2022/0324507 | A1 * | 10/2022 | Major | B62D 5/0403 |
| 2023/0026718 | A1 * | 1/2023 | Major | B62D 5/001 |
| 2023/0120929 | A1 | 4/2023 | Zhao et al. | |
| 2023/0271577 | A1 | 8/2023 | Birsching | |
| 2024/0132144 | A1 | 4/2024 | Wirth et al. | |
| 2024/0300570 | A1 | 9/2024 | Washnock | |

FOREIGN PATENT DOCUMENTS

| | | | |
|---|---|---|---|
| CN | 107176203 | A | 9/2017 |
| CN | 107140010 | B | 2/2019 |
| CN | 209225235 | U | 8/2019 |
| CN | 110733563 | A | 1/2020 |
| CN | 110654456 | B | 5/2021 |
| EP | 2019021 | A1 | 1/2009 |
| EP | 1946432 | B1 | 10/2010 |
| EP | 2450257 | A1 | 5/2012 |
| JP | 2004338553 | A | 12/2004 |
| JP | 2008254624 | A | 10/2008 |
| WO | 2016126644 | A1 | 8/2016 |
| WO | 2019039183 | A1 | 2/2019 |
| WO | 2022227601 | A1 | 6/2021 |

OTHER PUBLICATIONS

United States Patent and Trademark Office, "Final Office Action" issued in connection with U.S. Appl. No. 17/087,557, dated May 4, 2023, 13 pages.
United States Patent and Trademark Office, "Non-Final Office Action" issued in connection with U.S. Appl. No. 17/192,703, dated Jul. 6, 2023, 9 pages.
United States Patent and Trademark Office, "Advisory Action," issued in connection with U.S. Appl. No. 17/087,557, dated Jul. 13, 2023, 3 pages.
United States Patent and Trademark Office, "Advisory Action," issued in connection with U.S. Appl. No. 17/087,557, dated Aug. 15, 2023, 3 pages.
United States Patent and Trademark Office, "Notice of Allowance and Fee(s) Due," issued in connection with U.S. Appl. No. 17/192,703, dated Aug. 30, 2023, 7 pages.
United States Patent and Trademark Office, "Notice of Allowance and Fee(s) Due," issued in connection with U.S. Appl. No. 17/087,557, dated Sep. 13, 2023, 5 pages.
United States Patent and Trademark Office, "Corrected Notice of Allowance," issued in connection with U.S. Appl. No. 17/087,557, dated Oct. 19, 2023, 4 pages.
United States Patent and Trademark Office, "Supplemental Notice of Allowance" issued in connection with U.S. Appl. No. 17/192,703, dated Dec. 4, 2023, 2 pages.
United States Patent and Trademark Office, "Non-Final Office Action," issued in connection with U.S. Appl. No. 18/181,394, dated Oct. 1, 2025, 22 pages.

* cited by examiner

STEERING GEARS WITH ELECTRIC STEERING ASSIST SYSTEMS AND RELATED METHODS

FIELD OF THE DISCLOSURE

This disclosure relates generally to steering systems and, more particularly, to steering gear with electric steering assist systems and related methods.

BACKGROUND

Known vehicles typically include a mechanical linkage that connects the front wheels of a vehicle to a steering wheel, which allows a driver to adjust the orientation of the front wheels by rotating the steering wheel. For example, many known steering systems include (1) rack and pinion steering systems, (2) worm and sector steering systems, and (3) recirculating ball steering systems, which translate the rotational motion of a steering wheel to linear actuation or movement of a drag link and/or tie rods connected to the front wheels. As the steering wheel rotates, the drag link and/or the tie rods change the angular orientation of the wheels and steer the vehicle.

SUMMARY

An example apparatus includes a shaft, a helical groove disposed on the shaft, a ball nut rack engaged with the helical groove, the ball nut rack including a plurality of bearings, a motor configured to apply force to the ball nut rack, and a gear housing, the ball nut rack, the helical groove, and the motor disposed within the gear housing.

An example vehicle includes a sensor, a steering gear assembly including a housing, a steering gear, a motor disposed within the housing, machine readable instructions, and programmable circuitry to at least one of instantiate or execute the machine readable instructions to determine a steering assist force based on an input from the sensor, and apply, via the motor, the steering assist force to the steering gear.

An example non-transitory machine readable storage medium including instructions to cause programmable circuitry to at least determine a steering assist force based on an input from a sensor of a vehicle, and apply the steering assist force to a steering gear of the vehicle via a magnetic array of a linear motor disposed with a housing of the steering gear, the steering gear disposed within the housing.

Figure 1:
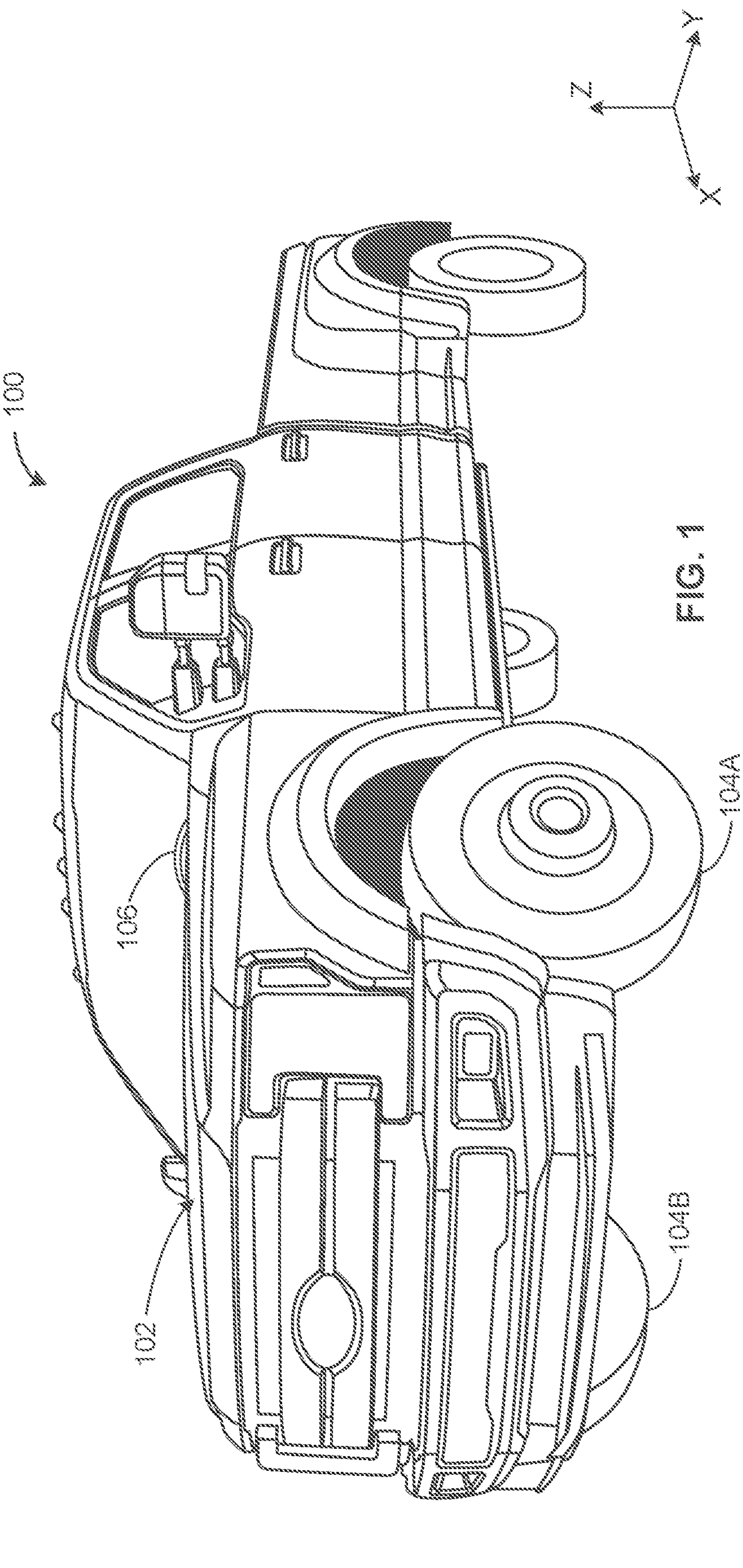
FIG. 1 illustrates an example vehicle in which the teachings of this disclosure can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Some known vehicles include recirculating ball steering gears. Recirculating ball steering gears are often used for heavier vehicles, such as heavy trucks, pick-up trucks, and sports utility vehicles (SUVs). Many recirculating ball steering gears include power steering assist systems to reduce the amount driver applied torque required to turn the wheels of a vehicle. Known power assist steering systems include hydraulic power assist steering systems (HPAS), which use engine-pressurized hydraulic fluid to apply steering assistance force to the steering system, electro-hydraulic power steering systems (EHPS), which uses electric motor pressurized hydraulic fluid to apply steering assistance force, and electric power assist steering (EPAS), which uses an electric motor to directly apply torque to the steering system. HPAS systems often have less precision when compared to EPAS systems and reduce engine power output to power hydraulic fluid pumps. Known EPAS systems often provided less assistance torque compared to the known HPAS systems. Additionally, many prior EPAS systems include relatively large bi-directional rotary electric motors, which increase the packaging space required for the steering assist system.

Examples disclosed herein include recirculating ball steering gears with integrated EPAS systems. The example integrated EPAS systems disclosed herein include motors that are disposed within the housing of the steering gear. In some such examples disclosed herein, the housing containing the motor and the steering gear is cylindrically shaped, which reduces the packaging space of the steering system when compared to prior recirculating ball steering gears with EPAS systems. Examples disclosed herein include one or more magnet arrays coupled to the steering gear housing and/or a ball nut rack of the steering gear. In some such examples disclosed herein, one or more of the magnet arrays are arranged in a Halbach configuration. In some examples disclosed herein, steering gears include a planetary reduction gear set disposed between the input shaft of the steering gear and the screw shaft of the steering gear. In some such examples disclosed herein, the planetary reduction gear set and/or the input shaft are coupled to an auxiliary motor to apply additional steering assist. Examples disclosed herein include vehicle steering control circuitry that determines a steering assist force to apply via the motor based on sensor data from the vehicle and/or the steering system.

Examples disclosed herein are suitable for non-driven axles, driven axles, front axles, and rear axles. Examples disclosed herein can be used with heavy trucks, light trucks, pick-up trucks, SUVs, and other light vehicles. Examples disclosed herein have reduced vehicle packaging space requirements and reduced vehicle weight, which increase vehicle fuel efficiency and payload capabilities.

As used herein, the orientation of some features is described with reference to a lateral axis, a vertical axis, and a longitudinal axis of the vehicle associated with the features. As used herein, the longitudinal axis of the vehicle is parallel to the centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. As used herein, unless otherwise stated, the term "above" describes the relationship of two parts relative to Earth and the vertical axis. A first part is above a second part, if the second part has at least one part between Earth and the first part. Likewise, as used herein, a first part is "below" a second part when the first part is closer to the Earth than the second part. As used herein, the lateral axis of the vehicle is perpendicular to the longitudinal and vertical axes and is generally parallel to the axles of the vehicle.

As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

In some examples used herein, the term "substantially" is used to describe a relationship between two parts that is within three degrees of the stated relationship (e.g., a substantially colinear relationship is within three degrees of being colinear, a substantially perpendicular relationship is within three degrees of being perpendicular, a substantially parallel relationship is within three degrees of being parallel, etc.). As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

FIG. 1 illustrates an example vehicle 100 in which the teachings of this disclosure can be implemented. In the illustrated example of FIG. 1, the vehicle 100 includes an example steering system 102, an example first wheel 104A, and an example second wheel 104B. In the illustrated example of FIG. 1, the example vehicle 100 is a pick-up truck. In other examples, the vehicle 100 can be any type of vehicle (e.g., a van, a coup, a sedan, a sports utility vehicle (SUV), a semi-trailer truck, a mini-van a railed vehicle, an all-terrain vehicle (ATV), watercraft, construction equipment, farming equipment, etc.). In the illustrated example of FIG. 1, the vehicle 100 is a two-axle vehicle. In other examples, the vehicle 100 can have additional axles and/or additional wheels. The example vehicle 100 can have a body-on-frame construction and/or a unibody construction.

In the illustrated example of FIG. 1, the steering system 102 includes an example steering wheel 106 to transmit driver inputs to the steering system 102 (e.g. by rotating the steering wheel, etc.). The steering system 102 receives these user inputs via the steering wheel 106, transforms the input into a lateral force via a steering gear, and rotates the wheels 104A, 104B to change the direction of the vehicle 100. The steering system 102 is described in additional detail below in conjunction with FIG. 2. While the steering system 102 is used to control a front axle of the vehicle 100, examples disclosed herein are also applicable to steering systems associated with rear-steered axles.

Figure 2:
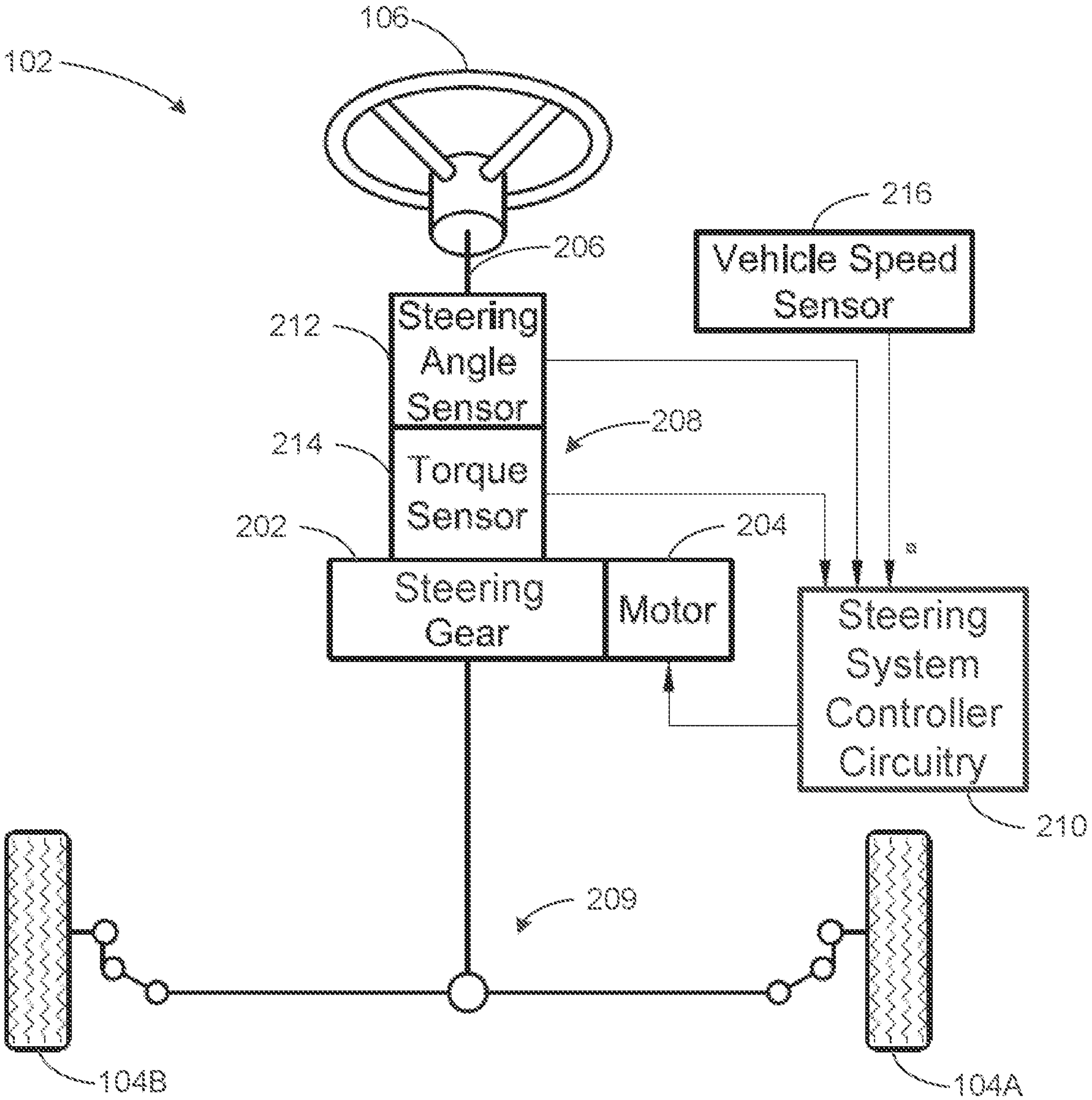
FIG. 2 is a schematic diagram of an example steering system of the vehicle of FIG. 1 implemented in accordance with the teachings of this disclosure.

FIG. 2 is a schematic diagram of the example steering system 102 of the vehicle 100 of FIG. 1 implemented in accordance with the teachings of this disclosure. The example steering system 102 includes an example steering gear 202, an example motor 204, an example steering column 206, an example intermediate shaft 208, example steering linkages 209, and example steering system controller circuitry 210. In the illustrated example of FIG. 2, the steering system controller circuitry 210 receives sensor information from an example steering angle sensor 212, an example torque sensor 214, and an example vehicle speed sensor 216.

The steering gear 202 is an actuator that receives steering inputs via an input shaft. The steering gear 202 can transform the input motion (e.g., caused by the rotation of the steering wheel 106 and/or a force applied via the motor 204, etc.) into a lateral force applied to the steering linkages 209 coupled thereto. In some examples, the lateral force output by the steering gear 202 turns the wheels of the wheels 104A, 104B of the vehicle 100, which controls the direction of travel of the vehicle 100. An example steering gear implemented in accordance with the teachings of this disclosure is described below in conjunction with FIGS. 3-6.

The motor 204 applies force to the steering gear 202. In the illustrated example of FIG. 2, the motor 204 is an electric motor that applies a force to the steering gear 202 based on an input from the steering system controller circuitry 210. In some examples, the motor 204 can include an associated cooling system that cools heat generated by operation of the motor 204. In some examples, the motor 204 is a linear electric motor (e.g., a motor producing a linear force, etc.) that includes one or more linear arrays of magnets. In some such examples, the force output by the motor 204 can be modulated by changing an electrical input current to one or more of the magnets of the magnet arrays of the motor 204. In some such examples, the motor 204 includes one or more Lorentz-type linear actuator(s). In some examples, the motor 204 can be powered via one or more batteries of the vehicle 100 (e.g., a starting, lighting, and ignition (SLI) battery of the vehicle 100, a battery of a battery electric vehicle (BEV), etc.). Additionally or alternatively, the motor 204 can be powered by an alternator of the vehicle 100. An example implementation of the motor 204 is described below in conjunction with FIGS. 4, 6, and 7.

The steering column 206 and the intermediate shaft 208 are steering shafts that transfer from the steering wheel 106 to the steering gear 202. In some examples, the steering column 206 and the intermediate shaft 208 are coupled via a universal joint (U-joint). In some examples, the intermediate shaft 208 can be coupled to the input shaft 308 of FIG. 3 of the steering gear 202 via a U-joint. In other examples, the columns of the steering system 102 can be coupled together via any suitable means. In some examples, some or all of the shafts of the steering system 102 can be absent. In some such examples, the steering system 102 can be a steer-by-wire system. In some examples, the steering gear 202 only receives inputs (e.g., input motion corresponding to a driver command, etc.) from the motor 204. In some such examples, the steering system controller circuitry 210 can determine a driver input via the steering angle sensor 212 and the torque sensor 214 and apply a corresponding input force to the steering gear 202.

The steering linkages 209 are a plurality of mechanical parts that couple the steering gear 202 to the wheels 104A, 104B. In some examples, the steering linkages 209 can include one or more control arms, one or more pitman arms, one or more drag links, one or more tie rods, one or more joints, etc. The steering linkages 209 enable an output of the steering gear 202 to change the direction of the wheels 104A, 104B, which changes the direction of the vehicle 100.

The steering system controller circuitry 210 determines a steering assist force to apply to the steering gear 202 via the motor 204. In some examples, the steering system controller circuitry 210 can determine a steering assist force to apply to the steering gear 202 based on one or more inputs from the steering angle sensor 212, the torque sensor 214, and/or the vehicle speed sensor 216. In some examples, the steering system controller circuitry 210 can determine a force to apply via the motor 204 based on a user input and/or a user preference. In some examples, the steering system controller circuitry 210 can determine a cooling demand of the motor 204. In some such examples, the steering system controller circuitry 210 can determine a cooling demand on the motor 204 based on a power output of the motor 204 and/or an ambient condition of the steering gear 202 (e.g., an ambient temperature of the vehicle 100, a temperature of an engine of the vehicle 100, etc.). In some examples, the steering system controller circuitry 210 can be implemented by an electronic control unit (ECU) of the vehicle 100. In other examples, the steering system controller circuitry 210 can be implemented by another suitable computer (e.g., another computer of the vehicle 100, a mobile device of a user of the vehicle 100, a remote computer, etc.).

The steering angle sensor 212 measures an angular or rotational position of the steering wheel 106. In the illustrated example of FIG. 2, the steering angle sensor 212 is disposed adjacent to the steering wheel 106. Additionally or alternatively, the steering angle sensor 212 can be disposed at another location on the steering column of the vehicle 100. The steering angle sensor 212 can be implemented by any suitable means of measuring steering angle (e.g., a rotary encoder, an optical encoder, a Hall-effect sensor, a resolver, a magnetic sensor, etc.). Additionally or alternatively, the steering angle may be derived from other metrics (e.g., steering velocity, steering acceleration, steering torque, etc.). In such examples, the steering angle sensor 212 can be absent.

The torque sensor 214 is a sensor that measures the steering torque applied by a user of the vehicle 100 to the steering wheel 106. The torque sensor 214 can be implemented by one or more strain gauges, one or more piezoelectric sensors, and/or one or more magnetoelastic sensors. In some examples, the torque sensor 214 can be disposed at any other suitable location on the steering shafts of the steering system 102 (e.g., disposed on the steering column 206, disposed on the intermediate shaft 208, disposed on an input shaft of the steering gear 202, etc.) In some examples, the steering torque may be derived from any other suitable measurable quantities. An example location of the torque sensor 214 is described below in conjunction with FIG. 6.

The vehicle speed sensor 216 is a sensor that measures the speed of the vehicle 100. In some examples, the vehicle speed sensor 216 can be coupled to a transmission of the vehicle 100. Additionally or alternatively, the vehicle speed sensor 216 can measure the rotational speed of one or more of the wheels 104A, 104B. In some examples, the vehicle speed sensor 216 can be implemented by one or more mechanical sensors (e.g., gear tooth sensors, etc.), one or more magnetoresistive sensors, one or more inductive sensors, one or more variable reluctance sensors, one or more hall effect sensors, etc.). In some examples, the vehicle speed may be derived from any other suitable measurable quantities. In some such examples, the vehicle speed sensor 216 is absent.

Figure 3:
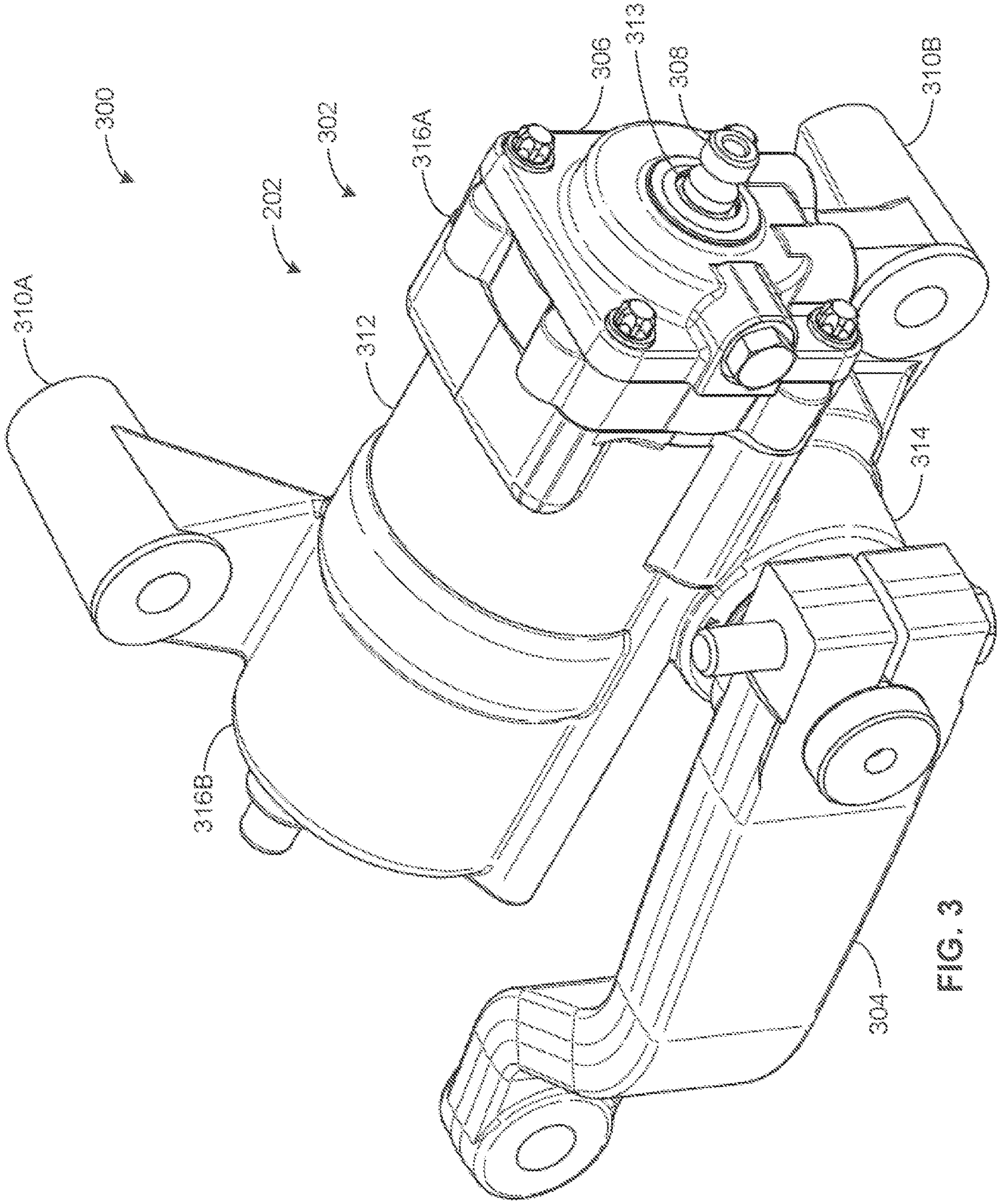
FIG. 3 is a perspective view of an example steering gear assembly of the steering system of FIG. 2.

FIG. 3 is a perspective view of an example steering gear assembly 300 of the steering system 102 of FIG. 2. In the illustrated example of FIG. 3, the steering gear assembly 300 includes the steering gear 202 of FIG. 2, an examples steering gear housing 302, an example pitman arm 304, an example cap 306, an example input shaft 308, and an example first mounting feature 310A, 310B. In the illustrated example of FIG. 3, the steering gear housing 302 includes an example first portion 312 and an example second portion 314. The steering gear assembly 300 can be disposed in a front engine compartment of the vehicle 100 (e.g., under a hood of the vehicle 100, etc.).

The steering gear housing 302 is a mechanical structure that houses the components of the steering gear 202, the motor 204 of FIG. 2 (not visible in FIG. 3), and/or a cooling system of the motor 204 (not illustrated). The steering gear housing 302 protects features of the steering gear 202 and the motor 204 from debris, fluids, and/or particulate matter. In some examples, the steering gear housing 302 is composed of a non-magnetic rigid material including one or more metals (e.g., aluminum, austenitic stainless steel, copper, bronze, etc.), one or more polymers (e.g., a plastic, etc.), and/or one or more ceramics, etc. In other examples, the steering gear housing 302 can be composed of any other suitable material (e.g., steel, cast iron, etc.). In the illustrated example of FIG. 3, the first portion 312 of the steering gear housing 302 (e.g., a top portion, a gear housing portion, etc.) encloses the steering gear 202 and the second portion 314 of the steering gear housing 302 (e.g., a bottom portion, a sector shaft portion, etc.) encloses a sector shaft and/or sector gear of the steering gear assembly 300. An example sector shaft and sector gear implemented in accordance with the teachings of this disclosure are described below in conjunction with FIG. 4. In the illustrated example of FIG. 3, the first portion 312 and the second portion 314 are unitary (e.g., the first portion 312 and the second portion 314 are an integral component, etc.). In other examples, the first portion 312 and the second portion 314 can be separate components. In some such examples, the first portion 312 and the second portion 314 can be joined via one or more fasteners, one or more welds, one or more chemical adhesives, one or more interference fits, etc. In some examples, the second portion 314 can be absent.

The first portion 312 has an example first end 316A and an example second end 316B. In the illustrated example of FIG. 3, the first end 316A is coupled to the cap 306 via a plurality of fasteners. Additionally or alternatively, the first end 316A and the cap 306 can be coupled in any other suitable matter (e.g., a press fit, a chemical adhesive, a weld, retained via compression, etc.). In other examples, the first end 316A and the cap 306 can be integral (e.g., unitary, etc.). In the illustrated example of FIG. 3, the first portion 312 (e.g., the portion containing the steering gear 202 and the motor 204, etc.) is generally cylindrically shaped (e.g., the first portion 312 is a cylindrical portion, etc.). In other examples, the first portion 312 of the steering gear housing 302 can be prismatic (e.g., a rectangular prism, a pentagonal prism, a hexagonal prism, a heptagonal prism, an octagonal prism, etc.). In the illustrated example of FIG. 3, the first portion 312 is composed of a single component. In other examples, the first portion 312 can be composed of multiple components.

The input shaft 308 operatively couples the steering gear 202 to the other shafts of the steering system 102 (e.g., the steering column 206 of FIG. 2, the intermediate shaft 208 of FIG. 2, etc.). The input shaft 308 rotates with the other shafts of the steering system 102 as a driver of the vehicle 100 rotates a steering wheel of the vehicle 100 (e.g., the steering wheel 106 of FIG. 1, etc.). In the illustrated example of FIG. 3, the input shaft 308 extends through an example opening 313 of the cap 306. In some examples, the opening 313 can include a bushing and/or bearing that supports the input shaft 308 during the operation of the steering gear 202.

The mounting features 310A, 310B are features that enable the steering gear assembly 300 to be coupled to another component of the vehicle 100. For example, the mounting features 310A, 310B enable the steering gear assembly to be coupled to the chassis, frame, and/or body of the vehicle 100. In the illustrated example of FIG. 3, the mounting features 310A, 310B are bushings. In other examples, the mounting features 310A, 310B can include any other suitable features that enable the steering gear assembly 300 to be coupled to another feature of the vehicle 100.

Figure 4:
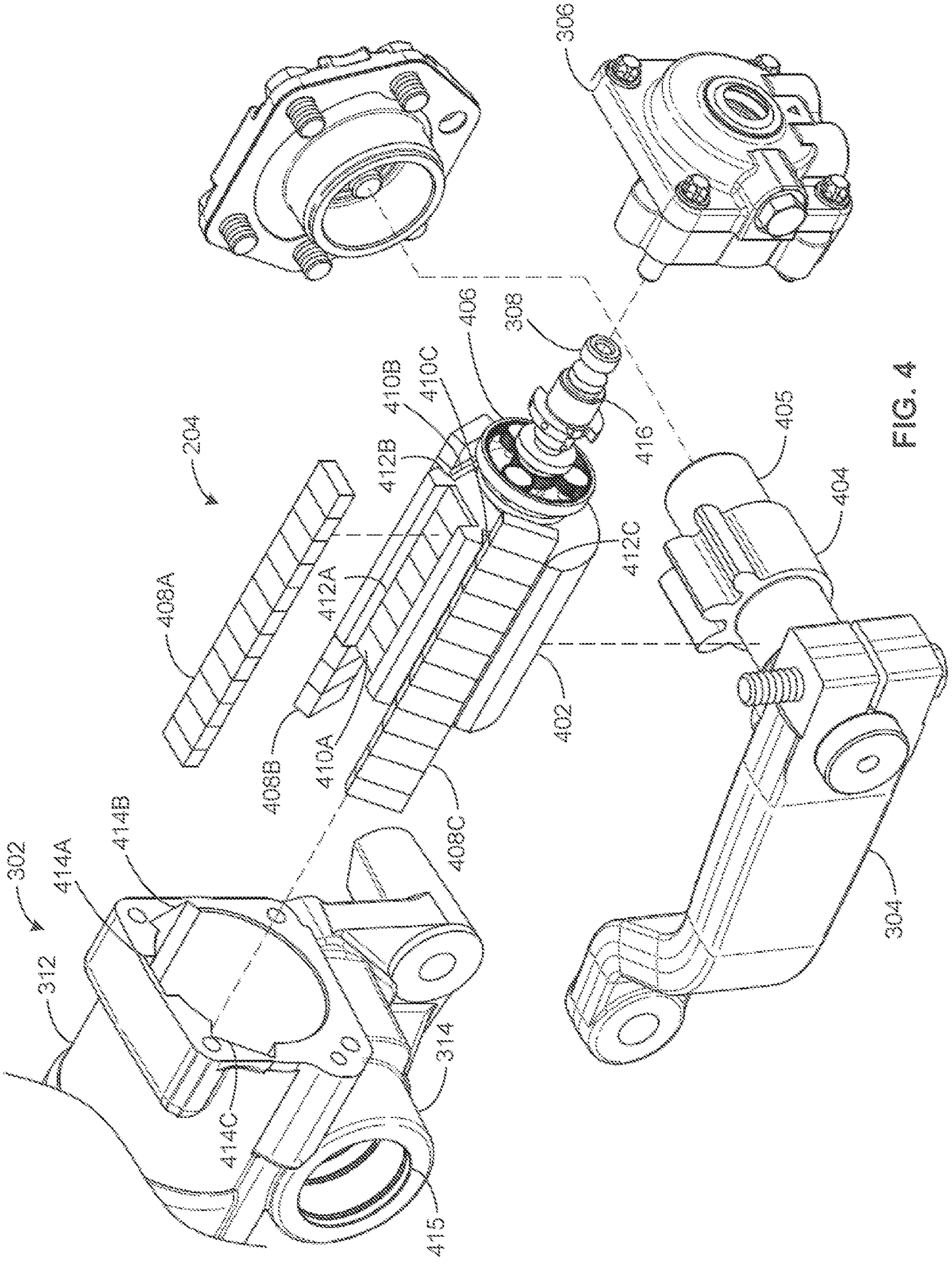
FIG. 4 is an exploded diagram of the steering gear assembly of FIG. 3.

FIG. 4 is an exploded diagram of the steering gear assembly 300 of FIG. 3 depicting the internal features of the steering gear housing 302 of FIG. 3. In the illustrated example of FIG. 4, the steering gear assembly 300 includes the steering gear housing 302 of FIG. 3, the pitman arm 304 of FIG. 3, the cap 306 of FIG. 3, and the input shaft 308 of FIG. 3, an example ball nut rack 402, an example sector gear 404, an example sector shaft 405, an example reduction gear set 406, and the example motor 204 of FIG. 2. In the illustrated example of FIG. 4, the motor 204 includes an example first housing magnet array 408A, an example second housing magnet array 408B, an example third housing magnet array 408C, an example first rack magnet array 410A, an example second rack magnet array 410B, and an example third rack magnet array 410C. In the illustrated example of FIG. 4, the ball nut rack 402 includes an example first rack slot 412A, an example second rack slot 412B, and an example third rack slot 412C. In the illustrated example of FIG. 4, the steering gear housing 302 includes an example first housing slot 414A, an example second housing slot 414B, and an example third housing slot 414C.

The ball nut rack 402 is a mechanical structure that translates within the steering gear housing 302 during the operation of the steering gear assembly 300. In the illustrated example of FIG. 4, the ball nut rack 402 is enclosed within the steering gear housing 302. The ball nut rack 402 can be composed of a non-magnetic rigid material including one or more metals (e.g., aluminum, austenitic stainless steel, copper, bronze, etc.), one or more polymers (e.g., a plastic, etc.), and/or one or more ceramics, etc. In other examples, the ball nut rack 402 can be composed of any other suitable material (e.g., steel, cast iron, etc.). In some examples, the ball nut rack 402 and/or a screw shaft disposed therein (not illustrated in FIG. 4) define a continuous circuit to enable the continuous flow of ball bearings therein. The internal structure of the ball nut rack 402 is described below in conjunction with FIG. 6.

The pitman arm 304 is a shaft coupled to the steering gear 202 via the sector shaft 405. The sector shaft 405 is disposed below the steering gear housing 302 and is coupled to the pitman arm 304. In some examples, the operation of the steering gear 202 causes the sector shaft 405 to rotate in response to the rotation of the input shaft 308 and/or force applied by the motor 204. The pitman arm 304 converts angular motion from the sector shaft 405 into linear motion, which is transmitted to the wheels (e.g., the wheels 104A, 104B, of FIGS. 1 and 2, etc.) via one or more steering linkages (e.g., the steering linkages 209 of FIG. 2, a drag link, etc.).

In the illustrated example of FIG. 4, the second portion 314 includes an example opening 415. The sector gear 404 and the sector shaft 405 are disposed within the opening 415 of the second portion 314 in the steering gear assembly 300. In the illustrated example of FIG. 4, the sector gear 404 is fixed to the sector shaft 405 (e.g., fixedly coupled, integral with, etc.). In some examples, the sector gear 404 can be coupled to the sector shaft 405 via one or more welds, via one or more chemical adhesives, via one or more fasteners, via one or more interference fits, and/or a combination thereof. In the illustrated example of FIG. 4, the sector gear 404 is enmeshed with the ball nut rack 402. The sector gear 404 links the steering gear 202 to the steering linkages of the vehicle 100 (e.g., the steering linkages 209 of FIG. 2, etc.).

The reduction gear set 406 is a gear assembly disposed between the input shaft 308 and the internal shaft of the steering gear 202. In the illustrated example of FIG. 4, the reduction gear set 406 is a planetary gear set. In other examples, the reduction gear set 406 can be implemented by any suitable gear train and/or gear set. In some examples, the reduction gear set 406 is absent. In some such examples, the input shaft 308 extends directly into the steering gear 202 (e.g., the input shaft 308 includes a worm gear/worm screw, the input shaft 308 is a screw shaft, etc.). The reduction gear set 406 is disposed within the cap 306, which protects the reduction gear set 406 from debris, fluids, and particulate matter. The reduction gear set 406 is described below in additional detail in conjunction with FIG. 5. In the illustrated example of FIG. 4, the input shaft 308 includes an example flange 416. In some examples, the flange 416 abuts an interior surface of the cap 306. In other examples, the flange 416 can be absent.

In the illustrated example of FIG. 4, the ball nut rack 402 includes the rack slots 412A, 412B, 412C, which receive corresponding ones of the housing magnet arrays 408A, 408B, 408C. In the illustrated example of FIG. 4, the rack slots 412A, 412B, 412C are formed in the outer diameter of the ball nut rack 402. In the illustrated example of FIG. 4, the rack slots 412A, 412B, 412C are rectangular channels (e.g., flat-walled channels, etc.). In other examples, the rack slots 412A, 412B, 412C can have any suitable shape that enables the ball nut rack 402 to translate (e.g., slide, etc.) along the housing magnet arrays 408A, 408B, 408C. In the illustrated example of FIG. 4, the rack slots 412A, 412B, 412C are shorter than the housing magnet arrays 408A, 408B, 408C, which enables the ball nut rack 402 to slide along the housing magnet arrays 408A, 408B, 408C during operation of the steering gear assembly 300. In some examples, the rack slots 412A, 412B, 412C are absent. In some such examples, the rack magnet arrays 410A, 410B, 410C can be flush with the outer diameter of the ball nut rack 402.

The housing slots 414A, 414B, 414C are formed in the inner diameter of the steering gear housing 302. In the illustrated example of FIG. 4, the housing slots 414A, 414B, 414C extend along the length of the steering gear housing 302 (e.g., extend from the first end 316A of FIG. 3 to the second end 316B of FIG. 3, etc.). The housing slots 414A, 414B, 414C are aligned with the rack slots 412A, 412B, 412C, respectively. In some such examples, the alignment of the housing slots 414A, 414B, 414C and the rack slots 412A, 412B, 412C permits the housing magnet arrays 408A, 408B, 408C to be disposed therein (e.g., a first portion of the housing magnet arrays 408A, 408B, 408C is disposed in the housing slots 414A, 414B, 414C, a second portion of the housing magnet arrays 408A, 408B, 408C is disposed in the rack slots 412A, 412B, 412C, etc.). In other examples, the housing slots 414A, 414B, 414C can include lip(s) that retain the housing magnet arrays 408A, 408B, 408C.

In the illustrated example of FIG. 4, the housing magnet arrays 408A, 408B, 408C are linear magnet arrays. The housing magnet arrays 408A, 408B, 408C are fixedly coupled to the steering gear housing 302. In some such examples, the housing magnet arrays 408A, 408B, 408C are retained within the housing slots 414A, 414B, 414C, respectively, via the abutment of the housing slots 414A, 414B, 414C and the cap 306. Additionally or alternatively, the housing magnet arrays 408A, 408B, 408C are retained within housing slots 414A, 414B, 414C via a magnetic force between the housing magnet arrays 408A, 408B, 408C and the steering gear housing 302. Additionally or alternatively, the housing magnet arrays 408A, 408B, 408C can be coupled to the steering gear housing via one or more fasteners, one or more chemical adhesives, one or more welds, and/or a combination thereof. In some examples, the housing magnet arrays 408A, 408B, 408C can include one or more electromagnet(s). Additionally or alternatively, the housing magnet arrays 408A, 408B, 408C can include one or more permanent magnet(s). In some examples, the magnets of the housing magnet arrays 408A, 408B, 408C can be in a Halbach configuration (e.g., the housing magnet arrays 408A, 408B, 408C are Halbach arrays, etc.), which reduces the magnetic field acting on the steering gear housing 302 and adjacent components of the vehicle 100.

In the illustrated example of FIG. 4, the rack magnet arrays 410A, 410B, 410C are linear magnet arrays. The rack magnets arrays 410A, 410B, 410C are fixedly coupled to the ball nut rack 402. In some examples, the rack magnets arrays 410A, 410B, 410C can be coupled to the ball nut rack 402 via one or more fasteners, one or more chemical adhesives, one or more welds, and/or a combination thereof. Additionally or alternatively, the rack magnets arrays 410A, 410B, 410C are retained within housing slots 414A, 414B, 414C via a magnetic force between the rack magnets arrays 410A, 410B, 410C and the ball nut rack 402. In the illustrated example of FIG. 4, the first rack magnet array 410A, the second rack magnet array 410B, and the third rack magnet array 410C are disposed at the bottom of the first rack slot 412A, the second rack slot 412B, and the third rack slot 412C, respectively. In some examples, the rack magnet arrays 410A, 410B, 410C can include one or more electromagnet(s). Additionally or alternatively, the rack magnet arrays 410A, 410B, 410C can include one or more permanent magnets. In some examples, the magnets of the rack magnet arrays 410A, 410B, 410C can be in a Halbach configuration (e.g., the rack magnet arrays 410A, 410B, 410C are Halbach arrays, etc.), which reduces the magnetic field acting on the internal features of the ball nut rack 402. In some examples, the rack magnet arrays 410A, 410B, 410C can be absent. In some such examples, the bottom of the rack slots 412A, 412B, 412C can include a ferrous material that is responsive to the magnetic field generated by the housing magnet arrays 408A, 408B, 408C.

In the illustrated example of FIG. 4, the steering gear assembly 300 includes three corresponding sets of internal magnets, external magnets, and grooves (e.g., the rack slots 412A, 412B, 412C, the housing magnet arrays 408A, 408B, 408C, and the rack magnet arrays 410A, 410B, 410C, etc.). In other examples, the steering gear assembly 300 can have a different number of magnet arrays and/or grooves (e.g., one set, two sets, four sets, ten sets, etc.).

In some examples, the housing magnet arrays 408A, 408B, 408C and/or the rack magnet arrays 410A, 410B, 410C generate heat, which can reduce the effectiveness of the steering gear 202, the housing magnet arrays 408A, 408B, 408C and/or the rack magnet arrays 410A, 410B, 410C. In some examples, the housing magnet arrays 408A, 408B, 408C and/or the rack magnet arrays 410A, 410B, 410C are cooled via conduction and/or convection into adjacent features of the vehicle 100 and/or the ambient environment of the steering gear assembly 300. Additionally, or alternatively, some or all of the housing magnet arrays 408A, 408B, 408C and/or the rack magnet arrays 410A, 410B, 410C can have associated cooling system(s) that are disposed within the steering gear housing 302 (e.g., partially disposed, fully disposed, etc.). For example, the housing magnet arrays 408A, 408B, 408C and/or the rack magnet arrays 410A, 410B, 410C can be air-cooled. In some such examples, the housing magnet arrays 408A, 408B, 408C, and/or the rack magnet arrays 410A, 410B, 410C can be cooled via one or more fans (not illustrated), which generate a flow of air that cools the housing magnet arrays 408A, 408B, 408C and/or the rack magnet arrays 410A, 410B, 410C via forced convection. Additionally or alternatively, the housing magnet arrays 408A, 408B, 408C and/or the rack magnet arrays 410A, 410B, 410C are liquid cooled. For example, the housing magnet arrays 408A, 408B, 408C and/or the rack magnet arrays 410A, 410B, 410C can include internal flow paths that permit the flow of a liquid coolant (e.g., oil, water, etc.) therethrough. In some examples, the liquid coolant system(s) of the housing magnet arrays 408A, 408B, 408C and/or the rack magnet arrays 410A, 410B, 410C can be a component of another cooling system of the vehicle 100 (e.g., coupled to an oil sump of the vehicle 100, associated with a compressor of a cabin cooling system, etc.). An example cooling system that can be used to cool the steering gear 202 is described below in conjunction with FIG. 6.

The motor 204 can apply steering assist force to the steering gear 202 by modulating the magnetic fields output by the rack magnet arrays 410A, 410B, 410C, and/or the housing magnet arrays 408A, 408B, 408C. For example, the housing magnet arrays 408A, 408B, 408C and/or rack magnet arrays 410A, 410B, 410C can include one or more electromagnets. In some such examples, the intensity and/or polarity of individual magnets of one or more the housing magnet arrays 408A, 408B, 408C, and/or the rack magnet arrays 410A, 410B, 410C can be controlled via the steering system controller circuitry 210 of FIG. 2. During operation, by controlling the output of the housing magnet arrays 408A, 408B, 408C, and/or the rack magnet arrays 410A, 410B, 410C, the motor 204 can generate a lateral electromagnetic force therebetween. In some such examples, because the rack magnet arrays 410A, 410B, 410C are fixed to the ball nut rack 402 and the housing magnet arrays 408A, 408B, 408C are coupled to the steering gear housing 302, the lateral force generated by the motor 204 causes the ball nut rack 402 to translate relative to the steering gear housing 302. Accordingly, by controlling the intensity and/or the polarity of the magnets of the housing magnet arrays 408A, 408B, 408C and/or the rack magnet arrays 410A, 410B, 410C, the steering system controller circuitry 210 can apply a steering assist force to the sector gear 404 via the motor 204.

During operation, the steering gear 202 receives driver inputs (e.g., from the steering wheel 106 of FIGS. 1 and 2, etc.) via the rotation of the input shaft 308. In some such examples, the rotation of the input shaft 308 is reduced via the reduction gear set 406, which is coupled to an internal shaft of the steering gear 202. In some examples, an auxiliary motor can be coupled to the reduction gear set 406 and/or the input shaft 308 to provide a steering assist to the steering system 102. An example auxiliary motor coupled to the reduction gear set 406 is described below in conjunction with FIG. 5. In some examples, the motor 204 provides steering assistance force by exerting a lateral electromagnetic force on the ball nut rack 402. For example, the steering system controller circuitry 210 of FIG. 2 can cause the motor 204 to modulate the intensity and/or polarity of the magnet arrays 408A, 408B, 408C, 410A, 410B, 410C, which increases the lateral force applied to the ball nut rack 402. The rotation input of the input shaft 308 and/or the motor 204 causes the ball nut rack 402 to translate within the steering gear housing 302 (e.g., relative to the steering gear housing 302, etc.), which causes the sector gear and the sector shaft 405 to rotate. As such, the translation of the ball nut rack 402 rotates the sector gear 404 and the sector shaft 405, which causes the rotation of the pitman arm 304 and the rotation of the wheels of the vehicle 100 (e.g., the wheels 104A, 104B of FIG. 1, etc.).

Figure 5:
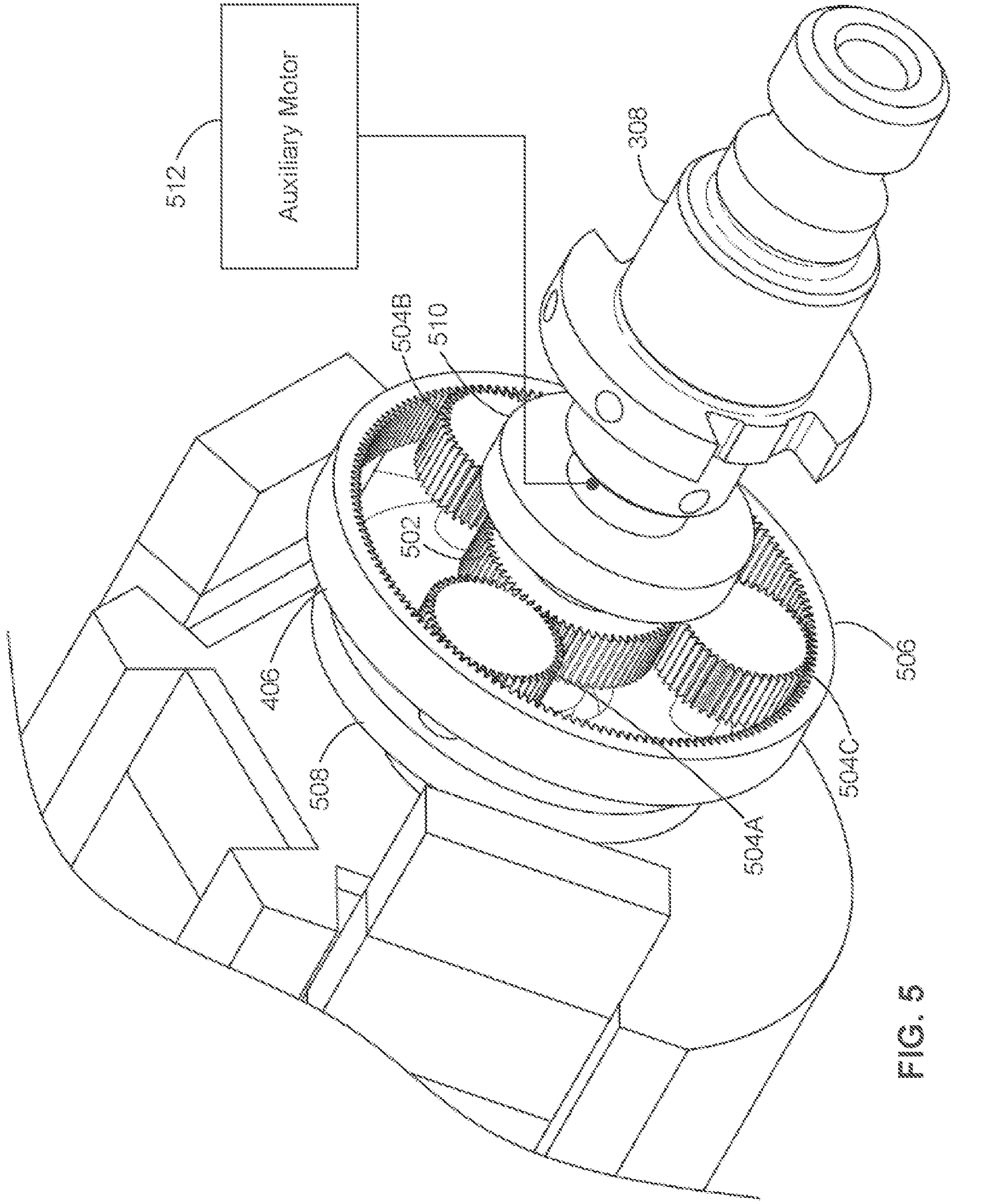
FIG. 5 is a perspective view of the input gear of the steering gear assembly of FIG. 3.

FIG. 5 is a perspective view of the input shaft 308 and the reduction gear set 406 of the steering gear assembly 300 of FIG. 3. In the illustrated example of FIG. 5, the reduction gear set 406 includes an example sun gear 502, an example first planet gear 504A, an example second planet gear 504B, an example third planet gear 504C, and an example carrier 506. In the illustrated example of FIG. 5, the planet gears 504A, 504B, 504C are fixedly coupled to an example flange 508. In the illustrated example of FIG. 5, an example sensor 510 is disposed on the input shaft 308. In the illustrated example of FIG. 5, the reduction gear set 406 is coupled to an example auxiliary motor 512.

The reduction gear set 406 is a planetary gear set (e.g., an epicyclic gear set, an epicyclic gear train, etc.). In the illustrated example of FIG. 5, the sun gear 502 (e.g., a center gear, an interior gear, a solar gear, etc.) is fixedly coupled to the input shaft 308 and rotates therewith. In the illustrated example of FIG. 5, the sun gear 502 is enmeshed with the planet gears 504A, 504B, 504C (e.g., pinions, peripheral gears, exterior gears, etc.). In the illustrated example of FIG. 5, the planet gears 504A, 504B, 504C are enmeshed with the carrier 506 (e.g., a ring gear, an annulus, etc.). In the illustrated example of FIG. 5, as the input shaft 308 and the sun gear 502 rotate, the planet gears 504A, 504B, 504C rotate around the sun gear 502, thereby causing the flange 508 to rotate. In some examples, the ratio of the rotational speed of the input shaft 308 and the flange 508 is based on number of the teeth on the sun gear 502, the planet gears 504A, 504B, 504C, and the carrier 506. The reduction gear set 406 reduces the rotational speed of the flange 508 compared to the input shaft, thereby increasing the steering ratio of the steering system 102. In some such examples, the gear speed reduction ratio of the reduction gear set 406 can be between 1:1.3 and 1.1.7. In the illustrated example of FIG. 5, the reduction gear set 406 includes three planet gears (e.g., the planet gears 504A, 504B, 504C, etc.). In other examples, the reduction gear set 406 can include any other suitable gear(s) and/or gear train(s). In other examples, the reduction gear set 406 can be implemented by any other suitable gears. In other examples, the reduction gear set 406 can be absent. In some such examples, the input shaft 308 can be directly coupled to the flange 508 and/or the sector shaft of the steering gear 202.

The flange 508 is a mechanical structure that is coupled to an internal shaft of the steering gear 202. In the illustrated example of FIG. 5, the flange 508 is annularly shaped. In other examples, the flange 508 can have any other suitable shape. In the illustrated example of FIG. 5, the flange 508 is substantially coaxial with the input shaft 308 and the sun gear 502. The relationship between the flange 508 and the components of the steering gear 202 is described in additional detail below in conjunction with FIG. 6.

The sensor 510 is disposed on the input shaft 308 and is adjacent to the reduction gear set 406. In some examples, the sensor 510 can implement the steering angle sensor 212 of FIG. 2 and/or the example torque sensor 214 of FIG. 2. In some examples, the sensor 510 can be absent. In some such examples, the steering angle sensor 212 of FIG. 2 and/or the example torque sensor 214 of FIG. 2 can be implemented by one or more sensors disposed at another location in the steering system 102.

The auxiliary motor 512 is an electric motor that applies torque to the steering system 102. The auxiliary motor 512 can be implemented by any suitable type of electric motor (e.g., a universal motor, an AC motor, etc.). The auxiliary motor 512 can apply torque to the input shaft 308 via any suitable drive mechanism (e.g., a belt and pulley, a gear, a clutch, etc.). In some examples, the auxiliary motor 512 can adjust the amount of torque applied to the reduction gear set 406 and the steering assist associated with the steering system 102. In the illustrated example of FIG. 5, the auxiliary motor 512 can apply a torque to the input shaft 308. In other examples, the auxiliary motor 512 can apply a torque to the reduction gear set 406 at any other suitable location (e.g., on the sun gear 502, on one or more of the planet gears 504A, 504B, 504C, on the carrier 506, on the flange 508, etc.). In some examples, the auxiliary motor 512 can be powered via one or more batteries of the vehicle 100 (e.g., a starting, lighting, and ignition (SLI) battery of the vehicle 100, a battery of a battery electric vehicle (BEV), etc.). Additionally or alternatively, the auxiliary motor 512 can be powered by an alternator of the vehicle 100. Additionally or alternatively, the auxiliary motor 512 can receive mechanical power from an engine of the vehicle 100. In some examples, the auxiliary motor 512 can be absent. In some such examples, the steering assistance associated with the steering system 102 is only provided by the motor 204 of FIG. 2. In some examples, if the vehicle 100 is autonomous and/or semi-autonomous, the auxiliary motor 512 can be provide input to the input shaft 308.

Figure 6:
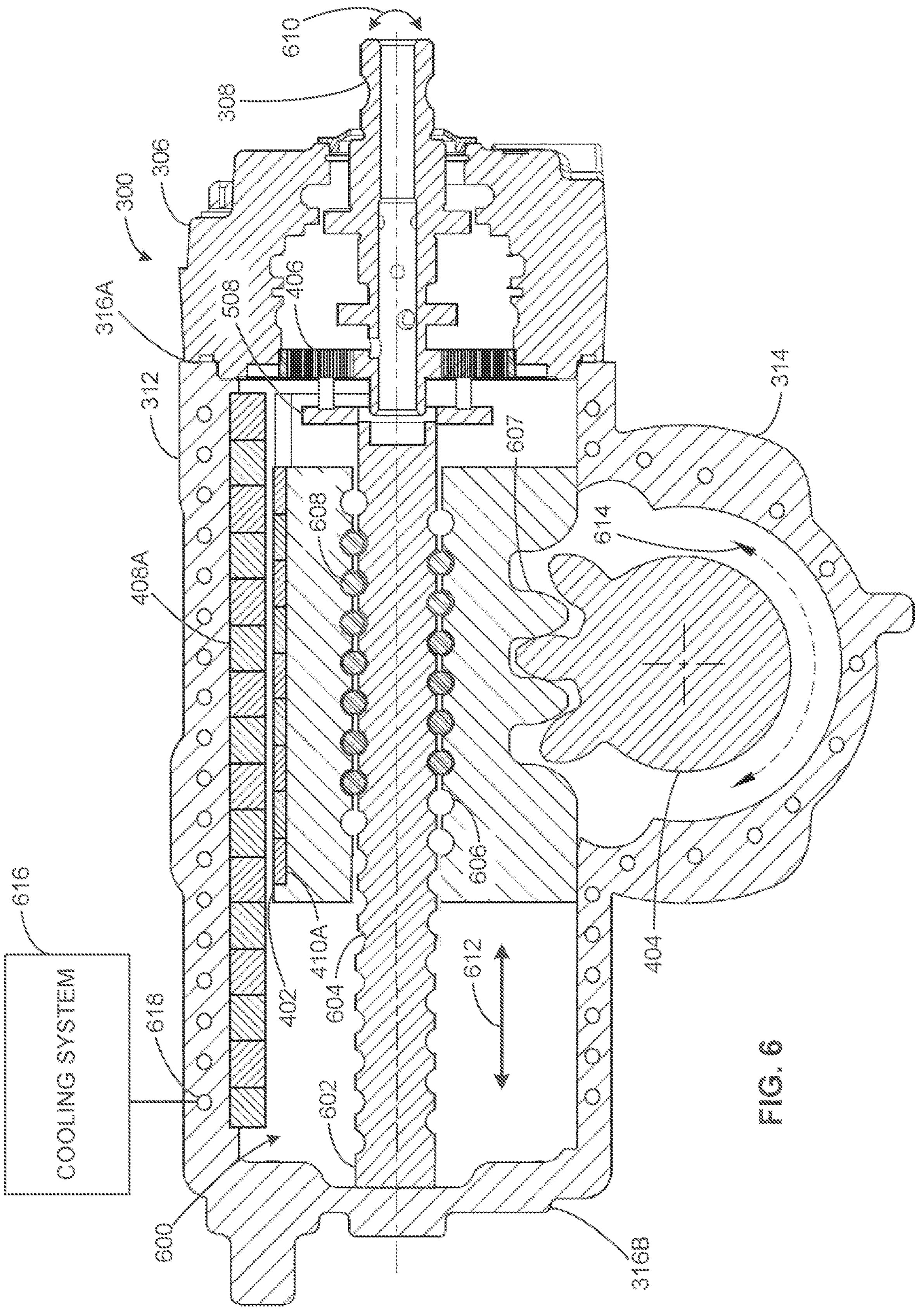
FIG. 6 is a cross-sectional view of the steering gear of FIG. 3.

FIG. 6 is a cross-sectional view of an example interior 600 of the steering gear assembly 300 of FIG. 3. In the illustrated example of FIG. 6, the first portion 312 of the steering gear housing 302 has an example screw shaft 602 and the ball nut rack 402 of FIG. 4 disposed therein. In the illustrated example of FIG. 6, the second portion 314 has the sector gear 404 disposed therein. In the illustrated example of FIG. 6, the screw shaft 602 includes an example first helical groove 604 and the ball nut rack 402 includes an example second helical groove 606 and example external teeth 607. In the illustrated example of FIG. 6, the interior 600 includes example ball bearings 608. During operation of the steering gear 202, example first rotation 610 of the input shaft 308 of FIG. 3 and the screw shaft 602 cause example translation 612 of the ball nut rack 402 within the interior 600 of the steering gear assembly 300 and example second rotation 614 of the sector gear 404. In the illustrated example of FIG. 6, the interior 600 of the steering gear assembly 300 includes the first rack magnet array 410A and the first housing magnet array 408A.

The screw shaft 602 is coupled to the input shaft 308 via the reduction gear set 406 and flange 508. In the illustrated example of FIG. 6, the screw shaft 602 is integral (e.g., unitary, etc.) with the flange 508. In other examples, the flange 508 and the screw shaft 602 can be coupled via one or more welds, one or more fasteners, one or more chemical adhesives, one or more interference fits, and/or a combination thereof. In some examples, the reduction gear set 406 is absent. In some such examples, the screw shaft 602 and the input shaft 308 are a continuous shaft. In the illustrated example of FIG. 6, the screw shaft 602 extends between the first end 316A of the first portion 312 of the steering gear housing 302 and the second end 316B of the first portion 312 of the steering gear housing 302.

In the illustrated example of FIG. 6, the screw shaft 602 is a worm gear that includes the first helical groove 604 (e.g., a helical channel, a worm screw, etc.), which extends radially around an outer diameter of the screw shaft 602. In the illustrated example of FIG. 6, the ball nut rack 402 includes the second helical groove 606 (e.g., a helical channel, etc.), which extends radially around an inner diameter of the ball nut rack 402. In the illustrated example of FIG. 6, the helical grooves 604, 606 have a constant pitch along the lengths of the screw shaft 602 and the ball nut rack 402, respectively. In other examples, the helical grooves 604, 606 can be varying pitch along the lengths of the screw shaft 602 and the ball nut rack 402 to modify the steering ratio. For example, the helical grooves 604, 606 can have a smaller pitch near the center of the screw shaft 602 and increased pitch near the ends of the screw shaft 602 to increase the steering ratio when the ball nut rack 402 is in a neutral position (e.g., the wheels 104A, 104B are aligned in the direction of travel of the vehicle 100, etc.) and to decrease the steering ratio when the ball nut rack 402 is near the first ends 316A or the second end 316B (e.g., the wheels 104A, 104B are near the maximum travel positions, the steering wheel of the vehicle 100 is near the lock position, etc.). In other examples, the helical grooves 604, 606 can have any other suitable configuration.

The screw shaft 602 is enmeshed with the ball nut rack 402 via the helical grooves 604, 606, and the ball bearings 608 disposed therein. The helical grooves 604, 606 are a raceway for the ball bearings 608. The ball bearings 608 reduce the friction between the screw shaft 602 and the ball nut rack 402, reduce the wear between the screw shaft 602 and the ball nut rack 402, and increase driver feedback from the steering system 102 (e.g., reduce noise, vibration, and/or harshness feedback, etc.). In some examples, the ball bearings 608 are absent (e.g., the steering gear 202 is a worm and sector steering gear, etc.). In some examples, the ball nut rack 402 includes an example continuous circuit (not illustrated) that enables the ball bearings 608 to recirculate through the helical grooves 604, 606 during the translation 612 of the ball nut rack 402.

In the illustrated example of FIG. 6, the screw shaft 602 undergoes the first rotation 610 from a driver input received via the input shaft 308, which causes the ball nut rack 402 to translate within the steering gear housing 302. For example, as the screw shaft 602 rotates via a rotational input from the reduction gear set 406, the ball bearings 608 move within the helical grooves 604, 606 and exert a lateral force on the ball nut rack 402 that causes the translation 612. For example, the ball nut rack 402 moves towards the input shaft 308 as the screw shaft 602 rotates clockwise and moves away from the input shaft 308 as the screw shaft 602 rotates counterclockwise. In some examples, the translation 612 of the ball nut rack 402 can be caused by a steering assist generated by the first rack magnet array 410A and the first housing magnet array 408A and/or other magnet arrays of the motor 204 (e.g., the magnet arrays 408B, 408C, 410B, 410C, etc.). For example, an electromagnetic force can be generated between the first rack magnet array 410A and the first housing magnet array 408A by controlling the intensity and/or polarity of one or more of the magnets of the first rack magnet array 410A and/or the first housing magnet array 408A. In some such examples, the generated electromagnetic force acts between the ball nut rack 402 and the steering gear housing 302 and assists the translation 612 generated by the first rotation 610. An example configuration of the first rack magnet array 410A and the first housing magnet array 408A causing a translation of the ball nut rack 402 is described below in conjunction with FIG. 7.

The translation 612 of the ball nut rack 402 within the steering gear housing 302 causes the external teeth 607 to exert a corresponding force on the sector gear 404, which causes the second rotation 614 of the sector gear 404. The second rotation 614 of the sector gear 404 causes a corresponding rotation of the sector shaft 405 (not illustrated in FIG. 6) and the pitman arm 304 (not illustrated in FIG. 6) and subsequent turning of the wheels 104A, 104B. In the illustrated example of FIG. 6, the external teeth 607 include two teeth that are enmeshed with three teeth of the sector gear 404. In other examples, the external teeth 607 can have any other number of teeth that are enmeshed with a corresponding number of teeth of the sector gear 404.

In the illustrated example of FIG. 6, the steering gear assembly 300 includes an example cooling system 616. In the illustrated example of FIG. 6, the cooling system 616 is a liquid cooling system that circulates a cooling liquid (e.g., water, synthetic oil, a mineral oil, ethylene glycol, diethylene glycol, propylene glycol, a combination of other coolants, etc.) through an example channel 618 formed in the steering gear housing 302. In the illustrated example of FIG. 6, the channel 618 is a single continuous channel formed in the steering gear assembly 300. Additionally or alternatively, the cooling system 616 can circulate liquid coolant through one or more machined grooves, channels, and/or holes. In some examples, the cooling system 616 can include a radiator that dissipates heat from hot coolant after leaving the channel 618. In some examples, the cooling system 616 can include one or more pumps to move liquid coolants through the cooling system 616 and channel 618. In some examples, the cooling system 616 can be a cooling system associated with an electric motor and/or internal combustion engine of the vehicle 100. In other examples, the cooling system 616 can be an air-cooled system that includes one or more fans that directed air flow over and/or through the steering gear assembly 300. In some examples, the cooling system 616 can be absent.

Figure 7:
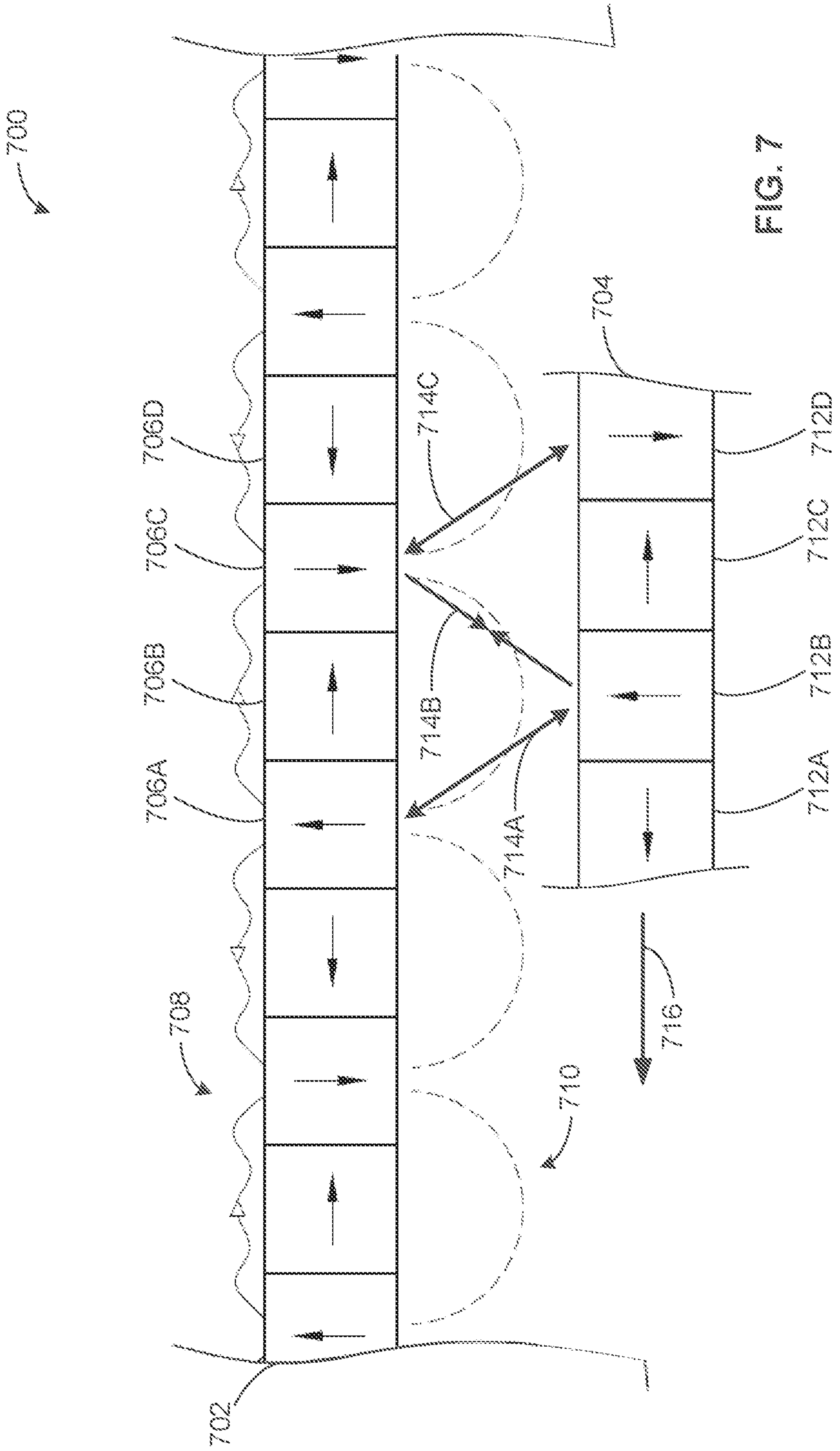
FIG. 7 is a schematic diagram of an example magnet arrangement that can be used in conjunction with the magnet arrays of FIG. 4.

FIG. 7 is a schematic diagram of an example magnet configuration 700 that can be used in conjunction with the magnet arrays 408A, 408B, 408C, 410A, 410B, 410C. In the illustrated example of FIG. 7, the magnet configuration includes an example first magnet array 702 and an example second magnet array 704. In the illustrated example of FIG. 7, the first magnet array 702 includes a plurality of magnets including an example first magnet 706A, an example second magnet 706B, an example third magnet 706C, and an example fourth magnet 706D, which generates an example first magnetic field 708 and an example second magnetic field 710. In the illustrated example of FIG. 7, the second magnet array 704 includes a plurality of magnets including an example fifth magnet 712A, an example sixth magnet 712B, an example seventh magnet 712C, and an example eighth magnet 712D. In the illustrated example of FIG. 7, the magnet arrays 702, 704 generate an example first magnetic force 714A, an example second magnetic force 714B, and an example third magnetic force 714C, which cause an example leftward translation 716. In some examples, the first magnet array 702 can implement some or all of the rack magnet arrays 410A, 410B, 410C and the second magnet array 704 can implement some or all of the housing magnet arrays 408A, 408B, 408C. In other examples, the first magnet array 702 can implement some or all of housing magnet arrays 408A, 408B, 408C and the second magnet array 704 can implement some or all of the housing magnet arrays 408A, 408B, 408C. In the illustrated example of FIG. 7, the magnets of the magnet arrays 702, 704 (e.g., the magnets 706A, 706B, 706C, 706D, 712A, 712B, 712C, 712D, etc.) include directional arrows that correspond to the orientation of the north pole (e.g., positive pole) of the respective magnets. As used herein, the "polarity" of the magnet refers to the position of the north pole of the magnet.

In the illustrated example of FIG. 7, the magnets of the first magnet array 702 are permanent magnets arranged in the Halbach configuration. For example, the first magnet 706A has an upward polarity, the second magnet 706B has a rightward polarity, the third magnet 706C has a downward polarity, and the fourth magnet 706D has a leftward polarity. In the illustrated example of FIG. 7, because the magnets of the first magnet array 702 are arranged in the Halbach configuration, the first magnet field 708 (e.g., the magnetic field that is distal to the second magnet array 704, etc.) is near zero and the second magnet field 710 (e.g., the magnetic field that is adjacent to the second magnet array 704, etc.) is comparatively strong. That is, the magnetic fields generated by the magnets 706A, 706B, 706C, 706D are subtractive on one side of the first magnetic array 702 (e.g., the side corresponding to the first magnetic field 708, etc.) and additive on an opposite side of the first magnetic array 702 (e.g., the side corresponding to the second magnetic field 710, etc.). For example, if one or more of the housing magnet arrays 408A, 408B, 408C of FIG. 4 has the configuration of the first magnetic array 702 of FIG. 7, components outside of the steering gear housing 302 of FIG. 3 would not be subjected to a magnetic field generated by the housing magnet arrays 408A, 408B, 408C of FIG. 4.

In the illustrated example of FIG. 7, the second magnetic array 704 is also arranged in the Halbach configuration. In some such examples, if one or more of the rack magnet arrays 410A, 410B, 410C of FIG. 4 have the configuration of the second magnetic array 704 of FIG. 7, components within the ball nut rack 402 (e.g., the ball bearings 608, etc.) would not be subjected to a magnetic field generated by the rack magnet arrays 410A, 410B, 410C of FIG. 4. Accordingly, the magnet configuration 700 of FIG. 7 does not inhibit the use of ferrous components within and/or near to the steering gear assembly 300.

During operation, the magnets 706A, 706B, 706C, 706D and the magnets 712A, 712B, 712C, 712D generate the magnetic forces 714A, 714B, 714C therebetween. For example, the polarities of the first magnet 706A and the sixth magnet 712B cause the first magnetic force 714A to be repulsive, the polarities of the sixth magnet 712B and the third magnet 706C cause the second magnetic force 714B to be attractive, the polarities of the third magnet 706C and the eighth magnet 712D cause the third magnetic force 714C to be repulsive. In the illustrated example of FIG. 7, the magnetic forces 714A, 714B, 714C exert a force on the second magnet array 704 in the same rightward direction, which causes the example leftward translation 716. In some examples, after the second magnet array 716 has undergone the leftward translation 716 and the magnets 706A, 706B, 706C, 706D and the magnets 712A, 712B, 712C, 712D no longer have the relative positions depicted in FIG. 7, the polarities of the magnets 712A, 712B, 712C, 712D of the second magnet array 704 can be changed to cause further rightward translation, leftward translation, and/or no relative movement between the magnet arrays 702, 704. It should be appreciated that the magnet configuration 700 causes the other magnets in addition to the magnets 706A, 706B, 706C, 706D, 712A, 712B, 712C, 712D of the magnet arrays 702, 704 to generate electromagnetic forces that also contribute to the leftward translation 716.

In the illustrated example of FIG. 7, the magnets 706A, 706B, 706C, 706D of the first magnetic array 702 are permanent magnets, and the magnets 712A, 712B, 712C, 712D of the second magnetic array 704 are electromagnets. In other examples, the magnets 706A, 706B, 706C, 706D of the first magnetic array 702 are electromagnets and the magnets 712A, 712B, 712C, 712D of the second magnetic array 704 are permanent magnets. In some such examples, the leftward translation 716 can be similarly induced by varying the polarity and/or intensity of the magnets 706A, 706B, 706C, 706D of the second magnetic array. In the illustrated example of FIG. 7, both the first magnetic array 702 and the second magnetic array 704 are arranged in the Halbach configuration. In other examples, the magnets of the first magnetic array 702 and the second magnetic array 704 can have any other suitable configuration (e.g., both include electromagnets, etc.).

Figure 8:
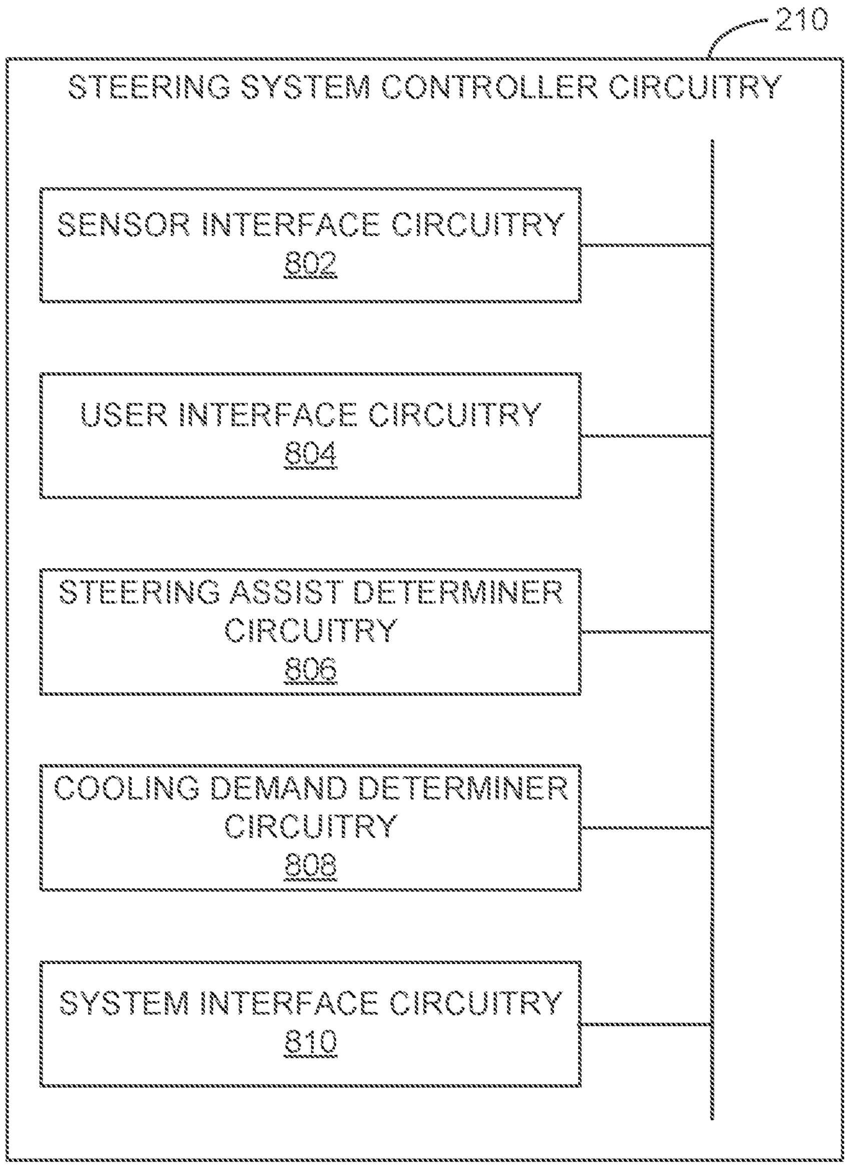
FIG. 8 is a block diagram of an example implementation of the steering system controller circuitry of FIG. 2.

FIG. 8 is a block diagram of an example implementation of the steering system controller circuitry 210 of FIG. 2 to operate the steering system 102 of FIG. 2. In the illustrated example of FIG. 8, the steering system controller circuitry 210 of FIG. 8 includes example sensor interface circuitry 802, example user interface circuitry 804, example steering assist determiner circuitry 806, example cooling demand determiner circuitry 808, and example system interface circuitry 810. The steering system controller circuitry 210 of FIG. 8 may be instantiated (e.g., creating an instance of, bring into being for any length of time, materialize, implement, etc.) by programmable circuitry such as a Central Processor Unit (CPU) executing first instructions. Additionally or alternatively, the steering system controller circuitry 210 of FIG. 8 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 8 may, thus, be instantiated at the same or different times. Some or all of the circuitry of FIG. 8 may be instantiated, for example, in one or more threads executing concurrently on hardware and/or in series on hardware. Moreover, in some examples, some or all of the circuitry of FIG. 8 may be implemented by microprocessor circuitry executing instructions and/or FPGA circuitry performing operations to implement one or more virtual machines and/or containers.

The sensor interface circuitry 802 accesses, requests, and/or receives sensor data from sensors associated with the sensors of the vehicle 100, the steering system 102, and/or the steering gear 202. For example, the sensor interface circuitry 802 can receive sensor data from the steering angle sensor 212, the torque sensor 214, and the vehicle speed sensor 216. In some examples, the sensor interface circuitry 802 can access sensor data from other sensors of the vehicle 100 (e.g., a steering acceleration sensor, a steering gear position sensor, etc.). In some examples, the sensor interface circuitry 802 can convert the data received from the steering angle sensor 212, the torque sensor 214, and/or the vehicle speed sensor 216 into a numerical form (e.g., human-readable, etc.). In some examples, the sensor interface circuitry 802 is instantiated by programmable circuitry executing sensor interface instructions and/or configured to perform operations such as those represented by the flowchart of FIG. 9.

In some examples, the steering system controller circuitry 210 includes means for sensor interfacing. For example, the means for sensor interfacing may be implemented by the sensor interface circuitry 802. In some examples, the sensor interface circuitry 802 may be instantiated by programmable circuitry such as the example programmable circuitry 1012 of FIG. 10. For instance, the sensor interface circuitry 802 may be instantiated by the example microprocessor 1100 of FIG. 11 executing machine executable instructions such as those implemented by at least block 902 of FIG. 9. In some examples, the sensor interface circuitry 802 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the sensor interface circuitry 802 may be instantiated by any other combination of hardware, software, and/or firmware. For example, the sensor interface circuitry 802 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The user interface circuitry 804 accesses user and/or vehicle preferences regarding steering assist. For example, the user interface circuitry 804 can receive an indication of an operation mode of the vehicle 100 from a user of the vehicle 100. For example, a user can input a desired steering assist effort curve (e.g., out of a plurality of pre-generated effort curves, etc.). Additionally or alternatively, the user interface circuitry 804 can receive an indication from a user to operate the vehicle 100 in a first mode (e.g., a casual mode, a comfort mode, a normal use mode, etc.) in which the steering gear 202 provides more steering assistance and a second mode (e.g., a sports mode, a performance mode, a race mode) in which the steering gear 202 provides lower steering assistance. Additionally or alternatively, the user interface circuitry 804 can access a steering effort curve from a memory associated with the vehicle 100. In some examples, the user interface circuitry 804 is instantiated by programmable circuitry executing user interface instructions and/or configured to perform operations such as those represented by the flowchart of FIG. 9.

In some examples, the steering system controller circuitry 210 includes means for user interfacing. For example, the means for user interfacing may be implemented by the user interface circuitry 804. In some examples, the user interface circuitry 804 may be instantiated by programmable circuitry such as the example programmable circuitry 1012 of FIG. 10. For instance, the user interface circuitry 804 may be instantiated by the example microprocessor 1100 of FIG. 11 executing machine executable instructions such as those implemented by at least block 904 of FIG. 9. In some examples, the user interface circuitry 804 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the user interface circuitry 804 may be instantiated by any other combination of hardware, software, and/or firmware. For example, the user interface circuitry 804 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The steering assist determiner circuitry 806 determines a steering assist force based on the sensor data and/or the user preferences. For example, the steering assist determiner circuitry 806 can determine the steering assistance force based on the sensor data accessed by the sensor interface circuitry 802 and/or the user interface circuitry 804. For example, the steering assist determiner circuitry 806 can determine the steering assist ratio using a look-up table, a mathematical function, and/or an effort curve. In some such examples, the look-up table, a mathematical function, and/or the effort curve can be based on the user preference (e.g., a first look-up table if the vehicle 100 is a casual mode, a second look-up table is a sport mode, etc.). In other examples, the steering assist determiner circuitry 806 can determine the steering assist force in any other suitable manner. In some examples, the steering assist determiner circuitry 806 is instantiated by programmable circuitry executing steering assist determiner instructions and/or configured to perform operations such as those represented by the flowchart of FIG. 9.

In some examples, the steering system controller circuitry 210 includes means for determining a steering assist. For example, the means for determining a steering assist may be implemented by the steering assist determiner circuitry 806. In some examples, the steering assist determiner circuitry 806 may be instantiated by programmable circuitry such as the example programmable circuitry 1012 of FIG. 10. For instance, the steering assist determiner circuitry 806 may be instantiated by the example microprocessor 1100 of FIG. 11 executing machine executable instructions such as those implemented by at least block 906 of FIG. 9 In some examples, the steering assist determiner circuitry 806 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the steering assist determiner circuitry 806 may be instantiated by any other combination of hardware, software, and/or firmware. For example, the steering assist determiner circuitry 806 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The cooling demand determiner circuitry 808 determines the cooling demand of the steering gear 202 and/or the motor 204. For example, the cooling demand determiner circuitry 808 can determine the amount of heat to be dissipated from the motor 204 and/or the steering gear 202. In some examples, the cooling demand determiner circuitry 808 can determine the cooling demand of the steering gear 202 and/or the motor 204 based on the sensor data accessed by the sensor interface circuitry 802. In some such examples, the cooling demand determiner circuitry 808 can determine the cooling demand based on the current temperature of one or more magnet arrays 408A, 408B, 408C, 410A, 410B, 410C and/or a power output of one or more of the magnet arrays 408A, 408B, 408C, 410A, 410B, 410C. In other examples, the cooling demand determiner circuitry 808 can determine the cooling demand of the motor 204 in any other suitable manner. In some examples, the cooling demand determiner circuitry 808 is instantiated by programmable circuitry executing cooling demand determiner instructions and/or configured to perform operations such as those represented by the flowchart of FIG. 9.

In some examples, the steering system controller circuitry 210 includes means for determining a cooling demand. For example, the means for determining a cooling demand may be implemented by cooling demand determiner circuitry 808. In some examples, the cooling demand determiner circuitry 808 may be instantiated by programmable circuitry such as the example programmable circuitry 1012 of FIG. 10. For instance, the cooling demand determiner circuitry 808 may be instantiated by the example microprocessor 1100 of FIG. 11 executing machine executable instructions such as those implemented by at least block 910 of FIG. 9. In some examples, the cooling demand determiner circuitry 808 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the cooling demand determiner circuitry 808 may be instantiated by any other combination of hardware, software, and/or firmware. For example, the cooling demand determiner circuitry 808 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The system interface circuitry 810 applies steering assist force to steering gear 202. For example, the system interface circuitry 810 can apply the steering assist force by changing the intensity and/or the polarity of one or more of the magnets of the magnet arrays 408A, 408B, 408C, 410A, 410B, 410C to create an electromagnetic force between the ball nut rack 402 and the steering gear housing 302 corresponding to the determined steering assist force. Additionally or alternatively, the system interface circuitry 810 can apply a torque to the steering gear via the auxiliary motor 512 of FIG. 5 and/or another electric motor coupled to the reduction gear set 406 and/or the input shaft 308. In other examples, the system interface circuitry 810 can apply the determined steering assist force by any other suitable means. In some examples, the system interface circuitry 810 is instantiated by programmable circuitry executing system interface instructions and/or configured to perform operations such as those represented by the flowchart of FIG. 9.

In some examples, the steering system controller circuitry 210 includes means for interfacing with a steering system. For example, the means for interfacing with a steering system may be implemented by the system interface circuitry 810. In some examples, the system interface circuitry 810 may be instantiated by programmable circuitry such as the example programmable circuitry 1012 of FIG. 10. For instance, the system interface circuitry 810 may be instantiated by the example microprocessor 1100 of FIG. 11 executing machine executable instructions such as those implemented by at least blocks 908, 914 of FIG. 9. In some examples, the system interface circuitry 810 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the system interface circuitry 810 may be instantiated by any other combination of hardware, software, and/or firmware. For example, the system interface circuitry 810 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the steering system controller circuitry 210 of FIG. 1 is illustrated in FIG. 8, one or more of the elements, processes, and/or devices illustrated in FIG. 8 may be combined, divided, re-arranged, omitted, eliminated, and/or implemented in any other way. Further, the sensor interface circuitry 802, the user interface circuitry 804, the steering assist determiner circuitry 806, the cooling demand determiner circuitry 808, the system interface circuitry 810, and/or, more generally, the example steering system controller circuitry 210 of FIG. 8, may be implemented by hardware alone or by hardware in combination with software and/or firmware. Thus, for example, any of the sensor interface circuitry 802, the user interface circuitry 804, the steering assist determiner circuitry 806, the cooling demand determiner circuitry 808, the system interface circuitry 810, and/or, more generally, the example steering system controller circuitry 210, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example steering system controller circuitry 210 of FIG. 8 may include one or more elements, processes, and/or devices in addition to, or instead of, those illustrated in FIG. 8, and/or may include more than one of any or all of the illustrated elements, processes and devices.

Figure 9:
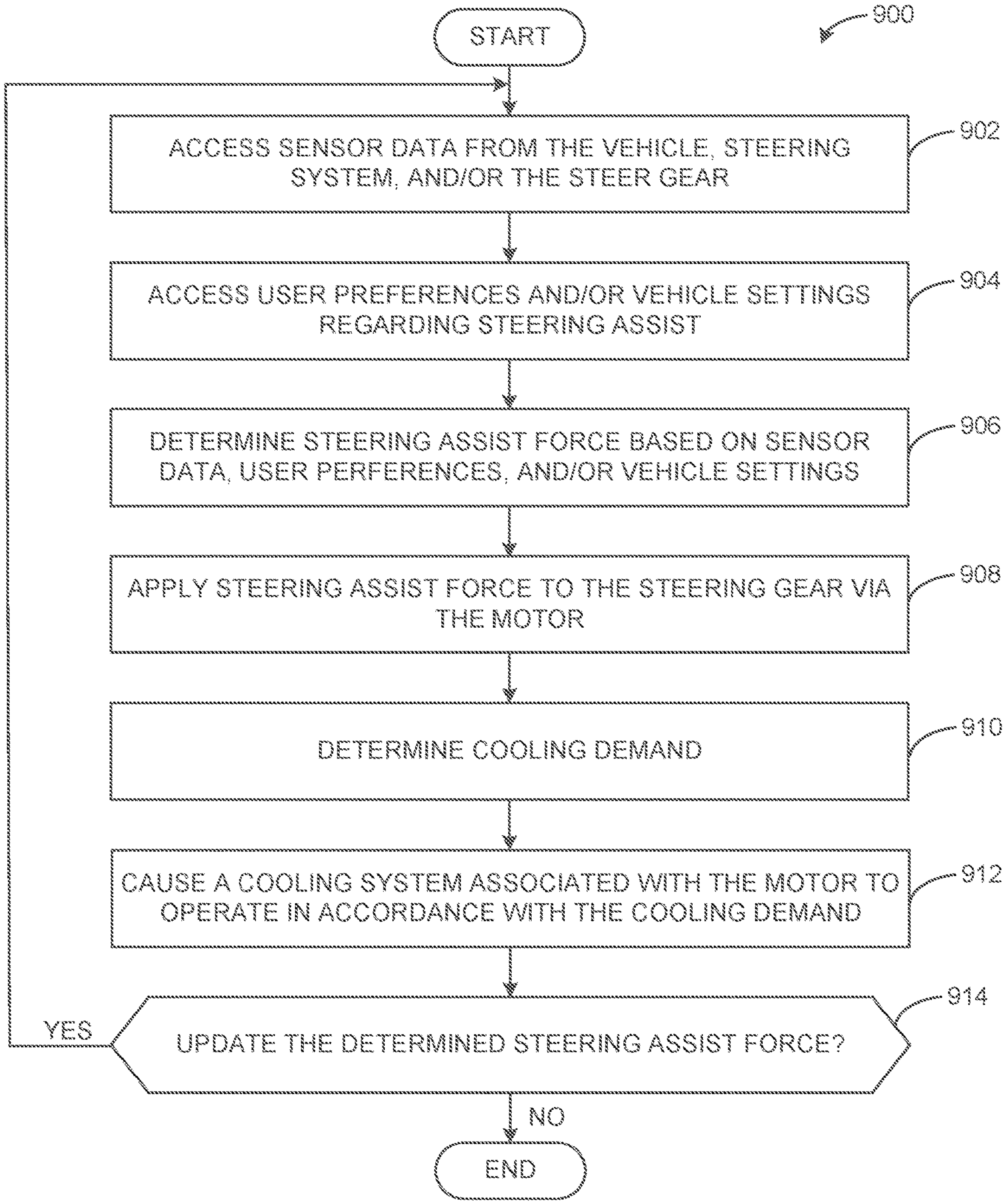
FIG. 9 is a flowchart representative of example machine readable instructions and/or example operations that may be executed, instantiated, and/or performed by example programmable circuitry to implement the steering system controller circuitry of FIG. 9.

A flowchart representative of example machine readable instructions, which may be executed by programmable circuitry to implement and/or instantiate the steering system controller circuitry 210 of FIG. 8 and/or representative of example operations which may be performed by programmable circuitry to implement and/or instantiate the steering system controller circuitry 210 of FIG. 8, are shown in FIG. 9. The machine readable instructions may be one or more executable programs or portion(s) of one or more executable programs for execution by programmable circuitry such as the programmable circuitry 1012 shown in the example programmable circuitry platform 1000 discussed below in connection with FIG. 11 and/or may be one or more function(s) or portion(s) of functions to be performed by the example programmable circuitry (e.g., an FPGA) discussed below in connection with FIGS. 11 and/or 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 9, many other methods of implementing the example steering system controller circuitry 210 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 9 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed, instantiated, and/or performed by programmable circuitry to operate the steering system 102 of FIGS. 1 and 2. The example machine-readable instructions and/or the example operations 900 of FIG. 9 begin at block 902, at which the sensor interface circuitry 802 accesses (e.g., requests, receives, etc.) sensor data from sensors associated with the sensors of the vehicle 100, the steering system 102, and/or the steering gear 202. For example, the sensor interface circuitry 802 can receive sensor data from the steering angle sensor 212, the torque sensor 214, and the vehicle speed sensor 216. In some examples, the sensor interface circuitry 802 can access sensor data from other sensors of the vehicle 100 (e.g., a steering acceleration sensor, a steering gear position sensor, an engine temperature sensor, a steering gear temperature sensor, etc.). In some examples, the sensor interface circuitry 802 can convert the data received from the steering angle sensor 212, the torque sensor 214, and the vehicle speed sensor 216 into a numerical form (e.g., human-readable, etc.).

At block 904, the user interface circuitry 804 accesses user and/or vehicle preferences regarding steering assist. For example, the user interface circuitry 804 can receive an indication of an operation mode of the vehicle 100 from a user of the vehicle 100. For example, a user can input a desired steering assistance effort curve (e.g., out of a plurality of pre-generated effort curves, etc.). Additionally or alternatively, the user interface circuitry 804 can receive an indication from a user to operate the vehicle 100 in a first mode (e.g., a casual mode, a comfort mode, a normal use mode, etc.) in which the steering gear 202 provides a higher more steering assist and a second mode (e.g., a sports mode, a performance mode, a race mode) in which the steering gear 202 provides a lower steering assistance. Additionally or alternatively, the user interface circuitry 804 can access a steering effort curve from a memory associated with the vehicle 100.

At block 906, the steering assist determiner circuitry 806 determines steering assist force based on the sensor data, the user preferences, and/or the vehicle settings. For example, the steering assist determiner circuitry 806 can determine the steering assistance force based on the sensor data accessed by the sensor interface circuitry 802 during the execution of block 902 and/or the user interface circuitry 804 during the execution of block 904. For example, the steering assist determiner circuitry 806 can determine the steering assist ratio using a look-up table, a mathematical function, and/or an effort curve. In some such examples, the look-up table, a mathematical function, and/or the effort curve can be based on the user preference (e.g., a first look-up table if the vehicle 100 is in a casual mode, a second look-up table if the vehicle 100 is in a sport mode, etc.). In other examples, the steering assist determiner circuitry 806 can determine the steering assist force in any other suitable manner.

At block 908, the system interface circuitry 810 applies steering assist force to the steering gear 202. For example, the system interface circuitry 810 can apply the steering assist force by changing the intensity and/or the polarity of one or more of the magnets of the magnet arrays 408A, 408B, 408C, 410A, 410B, 410C to create an electromagnetic force between the ball nut rack 402 and the steering gear housing 302 corresponding to the determined steering assist force. Additionally or alternatively, the system interface circuitry 810 can apply a torque to the steering gear via the auxiliary motor 512 of FIG. 5 and/or another electric motor coupled to the reduction gear set 406 and/or the input shaft 308. In other examples, the system interface circuitry 810 can apply the determined steering assist force by any other suitable means.

At block 910, the cooling demand determiner circuitry 808 determines the cooling demand of the steering gear 202 and/or the motor 204. For example, the cooling demand determiner circuitry 808 can determine an amount of heat to be dissipated from the motor 204 and/or the steering gear 202. In some examples, the cooling demand determiner circuitry 808 can determine the cooling demand of the steering gear 202 and/or the motor 204 based on the sensor data accessed by the sensor interface circuitry 802. In some such examples, the cooling demand determiner circuitry 808 can determine the cooling demand based on a current temperature of one or more magnet arrays 408A, 408B, 408C, 410A, 410B, 410C and/or a power output of one or more of the magnet arrays 408A, 408B, 408C, 410A, 410B, 410C. In other examples, the cooling demand determiner circuitry 808 can determine the cooling demand of the motor 204 in any other suitable manner. At block 912, the system interface circuitry 810 activate the cooling system of the motor in accordance with the cooling demand. For example, the system interface circuitry 810 can cause a cooling system associated with the motor 204 to operate in accordance with the cooling demand. For example, the system interface circuitry 810 can cause a pump and/or a fan associated with the cooling system to operate to dissipate the cooling demand.

At block 914, the system interface circuitry 810 determines if the steering assist force determination is to be updated. For example, the system interface circuitry 810 can update the steering assist force calculation periodically (e.g., every 50 milliseconds, every 100 milliseconds, every second, etc.). Additionally or alternatively, the system interface circuitry 810 can determine to update the determine steering assist force if one or more of the accessed sensor data changes (e.g., a change in the vehicle speed, a change in the steering torque, a change in the steering angle, etc.). If the system interface circuitry 810 determines the steering assist force is to be updated, the operations 900 return to block 902. If the system interface circuitry 810 determines the steering assist force is not to be updated, the operations 900 end.

Figure 10:
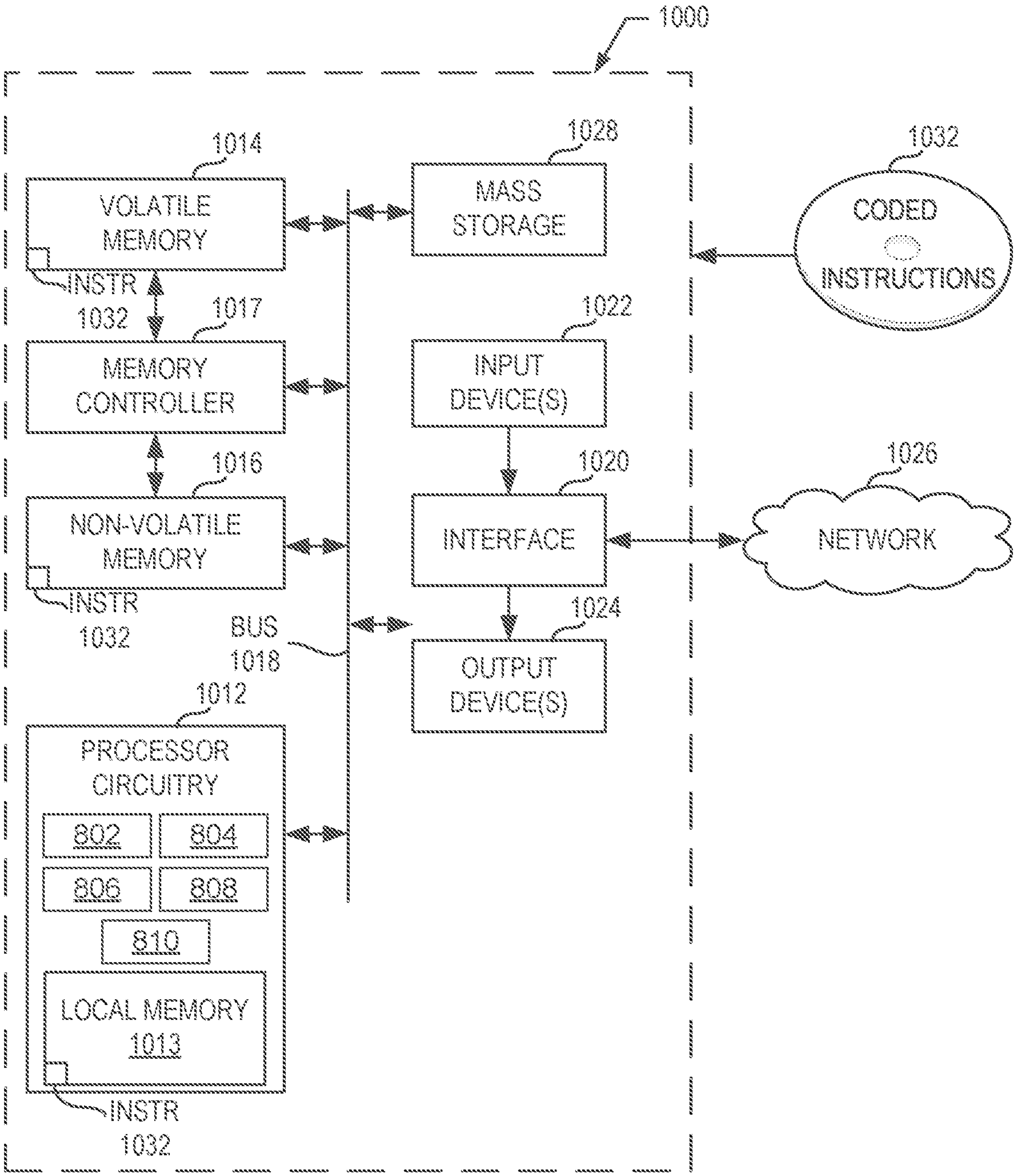
FIG. 10 is a block diagram of an example processing platform including programmable circuitry structured to execute, instantiate, and/or perform the example machine readable instructions and/or perform the example operations of FIG. 9 to implement the steering system controller circuitry of FIG. 8.

FIG. 10 is a block diagram of an example programmable circuitry platform 1000 structured to execute and/or instantiate the example machine-readable instructions and/or the example operations of FIG. 9 to implement the steering system controller circuitry 210 of FIG. 8. The programmable circuitry platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a gaming console, a headset (e.g., an augmented reality (AR) headset, a virtual reality (VR) headset, etc.) or other wearable device, or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements the sensor interface circuitry 802, the user interface circuitry 804, the steering assist determiner circuitry 806, the cooling demand determiner circuitry 808, and the system interface circuitry 810.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIGS. 9, may be stored in the mass storage device 1028, in the volatile memory 1014, in the non-volatile memory 1016, and/or on at least one non-transitory computer readable storage medium such as a CD or DVD which may be removable.

Figure 11:
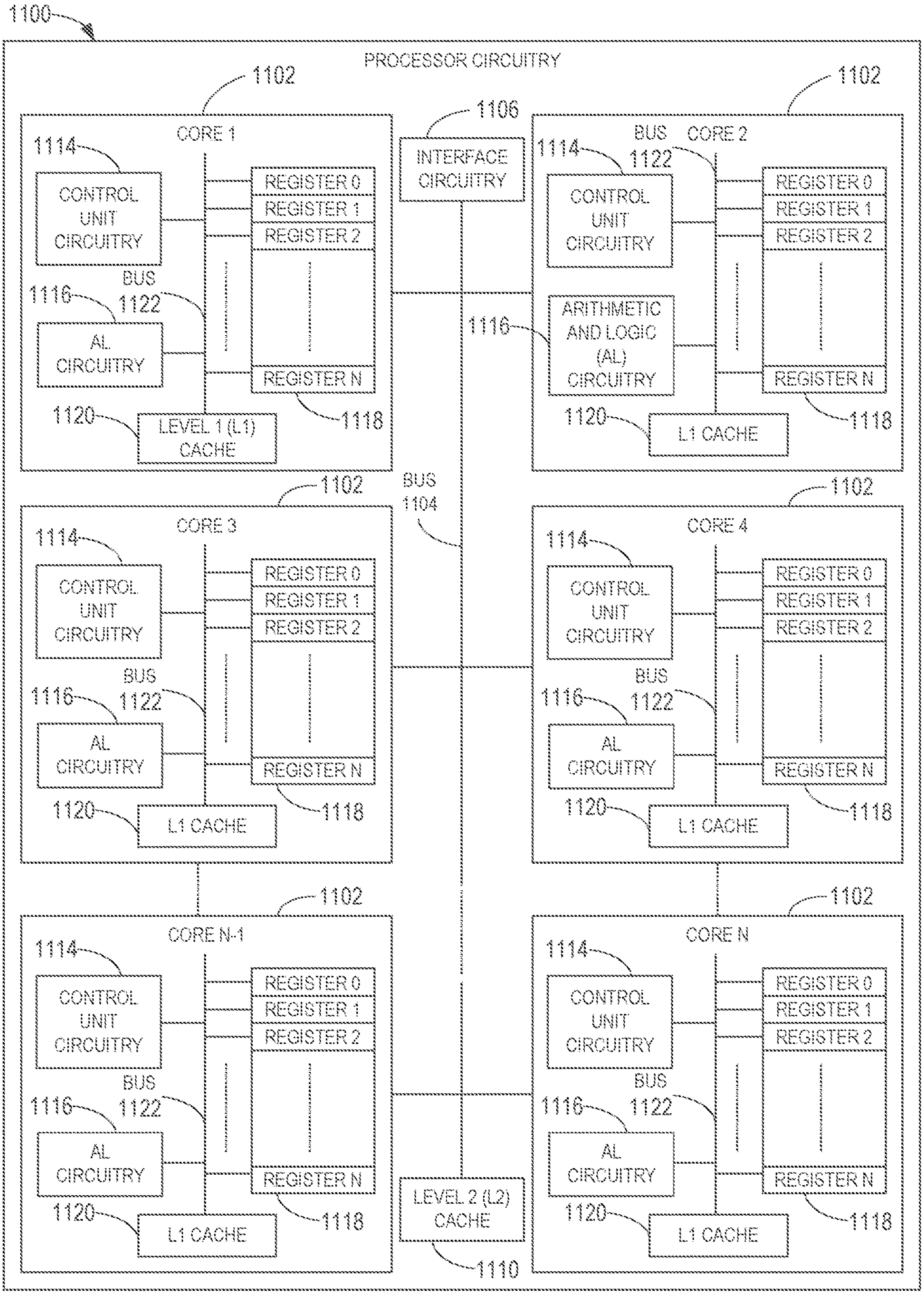
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowchart of FIG. 9 to effectively instantiate the circuitry of FIG. 2 as logic circuits to perform operations corresponding to those machine readable instructions. In some such examples, the circuitry of FIG. 8 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIG. 9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry 1116 (sometimes referred to as an ALU), a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
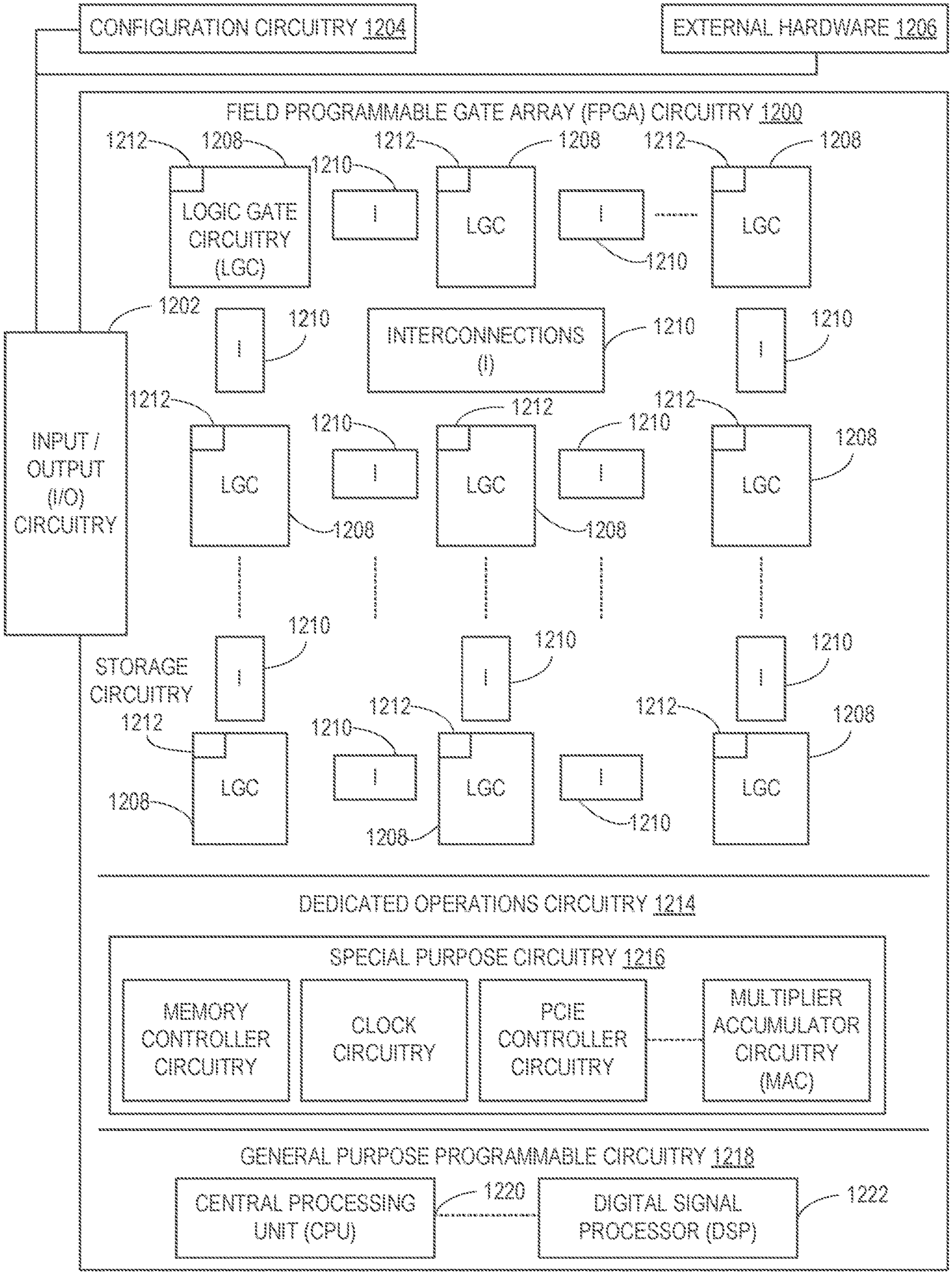
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowchart of FIG. 9 but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine readable instructions represented by the flowchart of FIG. 9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 9. As such, the FPGA circuitry 1200 may be configured and/or structured to effectively instantiate some or all of the operations/functions corresponding to the machine readable instructions of the flowchart of FIG. 9 as dedicated logic circuits to perform the operations/functions corresponding to those software instructions in a dedicated manner analogous to an ASIC. Therefore, the FPGA circuitry 1200 may perform the operations/functions corresponding to the some or all of the machine readable instructions of FIG. 9 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine readable instructions of FIGS. 9 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine readable instructions represented by the flowchart of FIG. 9 to perform first operation(s)/function(s), the FPGA circuitry 1200 of FIG. 12 may be configured and/or structured to perform second operation(s)/function(s) corresponding to a second portion of the machine readable instructions represented by the flowchart of FIG. 9, and/or an ASIC may be configured and/or structured to perform third operation(s)/function(s) corresponding to a third portion of the machine readable instructions represented by the flowchart of FIG. 9.

It should be understood that some or all of the circuitry of FIG. 8 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 8 may be instantiated, for example, in one or more threads executing concurrently and/or in series. For example, the microprocessor 1100 of FIG. 11 may execute machine readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 8 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Steering gear with electric steering assist systems and related methods are disclosed herein. Further examples and combinations thereof include the following:

Example 1 includes an apparatus comprising a shaft, a helical groove disposed on the shaft, a ball nut rack engaged with the helical groove, the ball nut rack including a plurality of bearings, a motor configured to apply force to the ball nut rack, and a gear housing, the ball nut rack, the helical groove, and the motor disposed within the gear housing.

Example 2 includes the apparatus of example 1, wherein the gear housing is cylindrically shaped.

Example 3 includes the apparatus of example 1, further including a cooling system to cool the motor, the cooling system at least partially disposed within the gear housing.

Example 4 includes the apparatus of example 1, wherein the motor includes a linear magnet array to apply a force to the ball nut rack.

Example 5 includes the apparatus of example 4, wherein the linear magnet array is a Halbach array.

Example 6 includes the apparatus of example 4, wherein the ball nut rack includes a plurality slots parallel to the shaft, and the motor further includes plurality of linear magnet arrays including the linear magnet array, each of the plurality of linear magnet arrays disposed in a corresponding one of the plurality slots.

Example 7 includes the apparatus of example 1, further including an input shaft, and a planetary reduction gear set coupling the input shaft to the shaft, the planetary reduction gear set including at least three planet gears.

Example 8 includes a vehicle comprising a sensor, a steering gear assembly including a housing, a steering gear, a motor disposed within the housing, machine readable instructions, and programmable circuitry to at least one of instantiate or execute the machine readable instructions to determine a steering assist force based on an input from the sensor, and apply, via the motor, the steering assist force to the steering gear.

Example 9 includes the vehicle of example 8, wherein the motor is a linear electric motor including a Halbach array.

Example 10 includes the vehicle of example 8, wherein the steering gear assembly further includes a screw shaft including a helical groove, the helical groove disposed within the housing, and a rack coupled to the helical groove, the rack disposed within the housing.

Example 11 includes the vehicle of example 10, further including an input shaft, and an epicyclic gear set coupling the input shaft to the screw shaft.

Example 12 includes the vehicle of example 11, wherein the sensor is a torque sensor disposed on the input shaft, the torque sensor disposed adjacent to an interior gear of the epicyclic gear set.

Example 13 includes the vehicle of example 8, wherein the housing includes a cylindrical portion.

Example 14 includes the vehicle of example 8, further including a steering wheel and wherein the sensor outputs at least one of (1) a steering torque, (2) a velocity of the vehicle, or (3) an angle of the steering wheel.

Example 15 includes the vehicle of example 8, wherein the steering gear assembly further includes a cooling system to cool the motor.

Example 16 includes a non-transitory machine readable storage medium comprising instructions to cause programmable circuitry to at least determine a steering assist force based on an input from a sensor of a vehicle, and apply the steering assist force to a steering gear of the vehicle via a magnetic array of a linear motor disposed with a housing of the steering gear, the steering gear disposed within the housing.

Example 17 includes the non-transitory machine readable storage medium of example 16, wherein the input includes at least one of (1) a steering torque, (2) a velocity of the vehicle, or (3) an angle of a steering wheel of the vehicle.

Example 18 includes the non-transitory machine readable storage medium of example 16, wherein the magnetic array is arranged in a Halbach configuration.

Example 19 includes the non-transitory machine readable storage medium of example 16, wherein the instructions cause programmable circuitry to determine a cooling demand of the linear motor, and operate a cooling system based on the cooling demand, the cooling system at least partially disposed in the housing.

Example 20 includes the non-transitory machine readable storage medium of example 16, wherein the steering gear is a recirculating ball steering gear. The following claims are hereby incorporated into this Detailed Description by this reference.

Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
a shaft;
a helical groove disposed on the shaft;
a ball nut rack engaged with the helical groove, the ball nut rack including a plurality of bearings and a plurality of slots parallel to the shaft;
a motor configured to apply force to the ball nut rack, the motor including a plurality of linear magnet arrays to apply the force to the ball nut rack, each of the plurality of linear magnet arrays disposed in a corresponding one of the plurality of slots; and
a gear housing, the ball nut rack, the helical groove, and the motor disposed within the gear housing.

2. The apparatus of claim 1, wherein the gear housing is cylindrically shaped.

3. The apparatus of claim 1, further including a cooling system to cool the motor, the cooling system at least partially disposed within the gear housing.

4. The apparatus of claim 1, wherein the linear magnet array is arrays include a Halbach array.

5. The apparatus of claim 1, further including:
an input shaft; and
a planetary reduction gear set coupling the input shaft to the shaft, the planetary reduction gear set including at least three planet gears.

6. A vehicle comprising:
a sensor;
a steering gear assembly including:
a housing;
a screw shaft including a helical groove, the helical groove disposed within the housing;
a ball nut rack engaged with the helical groove, the ball nut rack disposed within the housing;
a motor disposed within the housing, the motor including a linear magnet array to apply a force to the ball nut rack;
an input shaft; and
a planetary reduction gear set coupling the input shaft to the screw shaft, the planetary reduction gear set including at least three planet gears;
machine readable instructions; and
programmable circuitry to at least one of instantiate or execute the machine readable instructions to:
determine a steering assist force based on an input from the sensor; and
apply, via the motor, the steering assist force to the steering gear assembly.

7. The vehicle of claim 6, wherein the motor is a linear electric motor including a Halbach array.

8. The vehicle of claim 6, wherein the sensor is a torque sensor disposed on the input shaft, the torque sensor disposed adjacent to an interior gear of the planetary reduction gear set.

9. The vehicle of claim 6, wherein the housing includes a cylindrical portion.

10. The vehicle of claim 6, further including a steering wheel and wherein the sensor outputs at least one of (1) a steering torque, (2) a velocity of the vehicle, or (3) an angle of the steering wheel.

11. The vehicle of claim 6, wherein the steering gear assembly further includes a cooling system to cool the motor.

12. A steering system comprising:
a shaft including a helical groove;
a ball nut rack engaged with the helical groove, the ball nut rack including a plurality of bearings and a first magnetic array; and
a motor including a second magnetic array, the first magnetic array and the second magnetic array configured to provide magnetic forces that interact to translate the ball nut rack, at least one steerable wheel to rotate when the ball nut rack translates.

13. The steering system of claim 12, further including a cooling system to cool the motor.

14. The steering system of claim 12, wherein the shaft is a first shaft, further including:
an input shaft; and
an epicyclic gear set coupling the input shaft to the first shaft.

15. The steering system of claim 12, wherein the ball nut rack includes a plurality of slots parallel to the shaft, and the motor further includes a plurality of linear magnet arrays including the second magnet array, each of the plurality of linear magnet arrays disposed in a corresponding one of the plurality of slots.

* * * * *